United States Patent
Lee et al.

(10) Patent No.: US 11,605,128 B2
(45) Date of Patent: Mar. 14, 2023

(54) DECENTRALIZED ARCHITECTURE FOR PROPERTY-BACKED VEHICLES AND CREATION, PUBLICATION, AND DISTRIBUTED INVESTMENT

(71) Applicant: Tellus App, Inc., Menlo Park, CA (US)

(72) Inventors: Rocky Lee, Cupertino, CA (US); Tiancheng Zhu, Mountain View, CA (US)

(73) Assignee: Tellus App, Inc., Menlo Park, CA (US)

( * ) Notice: Subject to any disclaimer, the term of this patent is extended or adjusted under 35 U.S.C. 154(b) by 25 days.

(21) Appl. No.: 16/849,759

(22) Filed: Apr. 15, 2020

(65) Prior Publication Data

US 2021/0133882 A1    May 6, 2021

Related U.S. Application Data

(60) Provisional application No. 62/930,505, filed on Nov. 4, 2019.

(51) Int. Cl.
*G06Q 40/04* (2012.01)
*G06Q 40/06* (2012.01)
(Continued)

(52) U.S. Cl.
CPC .......... *G06Q 40/04* (2013.01); *G06F 16/245* (2019.01); *G06F 16/27* (2019.01);
(Continued)

(58) Field of Classification Search
CPC ....................................................... G06Q 40/04
See application file for complete search history.

(56) References Cited

U.S. PATENT DOCUMENTS 7,653,592 B1   1/2010   flaxman
7,747,526 B1   6/2010   Palumbo et al.
(Continued)

FOREIGN PATENT DOCUMENTS

AU   2003277959   * 10/2003
AU   2014201254   *  3/2013
(Continued)

OTHER PUBLICATIONS

Marot, et al, Investing in Online Peer to Peer Loans: A Platform for Alpha, Journal of Applied Business and Economics, vol. 19(2) (Year: 2017).*

(Continued)

*Primary Examiner* — Olabode Akintola
*Assistant Examiner* — Brandon M Duck
(74) *Attorney, Agent, or Firm* — Ahmann Kloke LLP

(57) ABSTRACT

A method comprising navigating to a first investment interface publishing a first particular loan opportunity among different loan opportunities, the loan opportunity being based on first loan terms and first property information, receiving different loan opportunities based on the first query, providing a selection of the first particular loan opportunity, receiving details of the first particular loan opportunity, providing a first commitment from the first investor system to partially fund a first partial funding of a loan amount associated with the first particular loan opportunity, a second commitment from the second investor system being already provided to the investment system to partially fund a second partial funding, receiving an indication that a first loan is to be provided to the first property owner when the loan amount is completely funded, and receiving distributions, every day, of daily returns by the first investor.

19 Claims, 21 Drawing Sheets

(51) Int. Cl.
*G06F 16/245* (2019.01)
*G06F 21/60* (2013.01)
*G06Q 20/10* (2012.01)
*G06Q 30/00* (2012.01)
*G06Q 30/06* (2012.01)
*G06Q 40/02* (2012.01)
*G06Q 50/00* (2012.01)
*G06Q 50/16* (2012.01)
*G06Q 50/18* (2012.01)
*H04L 29/06* (2006.01)
*G06Q 30/02* (2023.01)
*G06Q 10/10* (2023.01)
*G06Q 30/018* (2023.01)
*G06Q 20/12* (2012.01)
*H04L 9/40* (2022.01)
*G06F 16/9535* (2019.01)
*G06F 16/27* (2019.01)
*G06Q 30/0601* (2023.01)
*G06F 21/62* (2013.01)

(52) U.S. Cl.
CPC ........ *G06F 16/9535* (2019.01); *G06F 21/602* (2013.01); *G06F 21/6245* (2013.01); *G06Q 10/10* (2013.01); *G06Q 20/108* (2013.01); *G06Q 20/127* (2013.01); *G06Q 30/0185* (2013.01); *G06Q 30/0278* (2013.01); *G06Q 30/0605* (2013.01); *G06Q 30/0625* (2013.01); *G06Q 40/025* (2013.01); *G06Q 40/06* (2013.01); *G06Q 50/01* (2013.01); *G06Q 50/16* (2013.01); *G06Q 50/165* (2013.01); *G06Q 50/18* (2013.01); *G06Q 50/188* (2013.01); *H04L 63/0428* (2013.01); *H04L 63/08* (2013.01); *G06Q 2220/00* (2013.01); *G06Q 2220/10* (2013.01)

(56) References Cited

U.S. PATENT DOCUMENTS

| | | | | |
|---|---|---|---|---|
| 8,560,425 | B2* | 10/2013 | Freund | G06Q 40/00 |
| 8,577,793 | B1* | 11/2013 | Hecht | G06Q 40/00 |
| 8,756,151 | B1 | 6/2014 | Lubling | |
| 10,415,605 | B1 | 9/2019 | Benzschawel | |
| 10,438,288 | B1 | 10/2019 | Hartigan et al. | |
| 10,922,748 | B1* | 2/2021 | Rockfeller | |
| 2002/0138410 | A1 | 9/2002 | Siska | |
| 2002/0147670 | A1 | 10/2002 | Lange | |
| 2005/0102229 | A1 | 5/2005 | Kemper et al. | |
| 2005/0131787 | A1 | 6/2005 | Monteleone et al. | |
| 2005/0273423 | A1 | 12/2005 | Kiai et al. | |
| 2006/0074793 | A1 | 4/2006 | Hibbert | |
| 2006/0116952 | A1 | 6/2006 | Orfano | |
| 2006/0271470 | A1 | 11/2006 | McNamar | |
| 2006/0282376 | A1 | 12/2006 | Goldberg | |
| 2008/0120211 | A1 | 5/2008 | Oppenheimer et al. | |
| 2008/0126267 | A1 | 5/2008 | Rosen | |
| 2008/0281693 | A1* | 11/2008 | Erikson | G06Q 40/00 |
| 2009/0240609 | A1 | 9/2009 | Cho et al. | |
| 2009/0281952 | A1 | 11/2009 | Toffey et al. | |
| 2010/0184553 | A1 | 7/2010 | Wittkopp | |
| 2010/0185467 | A1 | 7/2010 | Strnad | |
| 2010/0198714 | A1 | 8/2010 | Orfano | |
| 2010/0198743 | A1 | 8/2010 | Plunket | |
| 2010/0332399 | A1 | 12/2010 | Benson et al. | |
| 2011/0191230 | A1 | 8/2011 | Avery | |
| 2012/0005111 | A2 | 1/2012 | Lowenstein et al. | |
| 2013/0041841 | A1 | 2/2013 | Lyons | |
| 2013/0151509 | A1 | 6/2013 | Tran | |
| 2014/0149277 | A1* | 2/2014 | Brown | G06Q 40/04 |
| 2014/0279692 | A1* | 9/2014 | Boothby | |
| 2015/0066740 | A1 | 5/2015 | DiCarlo | |
| 2016/0050199 | A1 | 2/2016 | Ganesan | |
| 2016/0078450 | A1 | 3/2016 | Warshaw et al. | |
| 2016/0292783 | A1 | 10/2016 | Nair | |
| 2017/0094165 | A1 | 3/2017 | Meadow et al. | |
| 2017/0206603 | A1 | 7/2017 | Al-Masoud | |
| 2017/0279815 | A1 | 9/2017 | Chung et al. | |
| 2017/0310647 | A1 | 10/2017 | Hu et al. | |
| 2018/0197246 | A1* | 7/2018 | Nienaber | G06Q 40/96 |
| 2018/0225758 | A1* | 8/2018 | Schneider | |
| 2020/0184553 | A1 | 6/2020 | Serrano | |
| 2020/0311808 | A1 | 10/2020 | Srivastava | |

FOREIGN PATENT DOCUMENTS

| | | |
|---|---|---|
| CA | 2981294 A1 | 4/2018 |
| WO | 2013026875 A1 | 2/2013 |
| WO | 2017145017 A1 | 8/2017 |

OTHER PUBLICATIONS

International Application No. PCT/US2020/058971, International Search Report and Written Opinion dated Feb. 4, 2021.
Colombo, Mark P. et al., "Auditing Investments," Mar. 11, 2006 [retrieved from https://www.acuia.org/sites/acuia.org/files/Auditing%20Investments%20PowerPoint%20060311.pptx on Apr. 14, 2021].
International Application No. PCT/US21/32112, Search Report and Written Opinion dated Sep. 1, 2021.

* cited by examiner

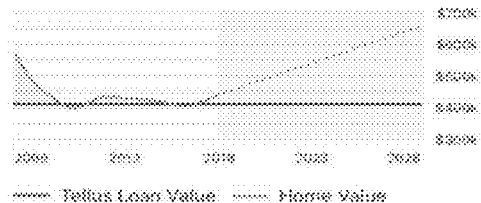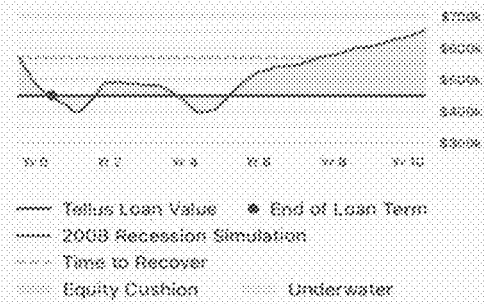
FIG. 11

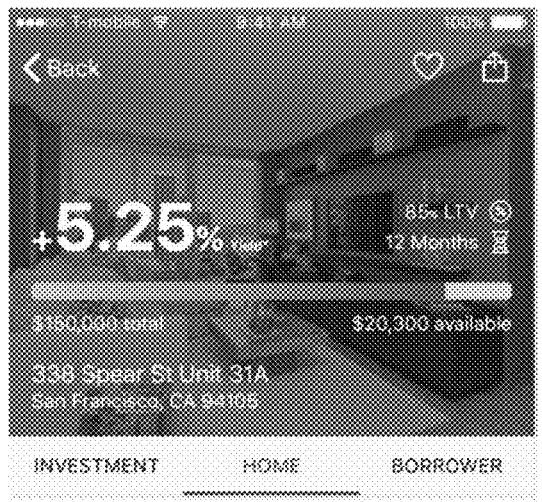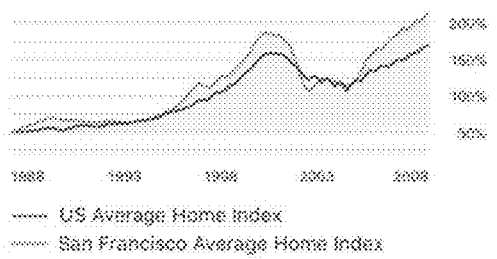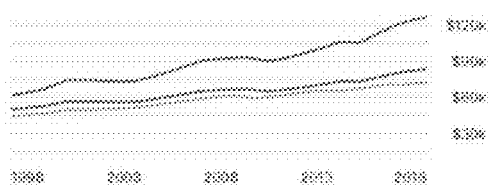
FIG. 12

FIG. 22

| Target Net Loan Amt= | 10,000 | |
|---|---|---|
| Loan PV= | 10,530.59 | $$pv = \frac{pv_2}{\left(1 - \left(\frac{r}{(1+r)^n}\right)\right) \cdot t}$$ |
| Escrow | 530.60 | |
| Net Loan Amount | 9,999.99 | |

| | | | |
|---|---|---|---|
| | | 0.025 | |
| Length of Loan | 365 | 1.000 (yrs) | <----AMORT OF LOAN |
| Amort/Term n= | 730 | 2 (yrs) | <----AMORT OF LOAN |
| Ann. Int. Rate r= | 5.0% | | |
| Daily Rate | 0.014% | 365 days/year | |
| Pmt per Day p= | 15.16 | | |
| Loan End | 12/31/2019 | | |
| PVt Denominator | 0.9496 | | |
| Upfront Escrow for Buffer | 35 | <----# of Pmts Escrowed | |
| neg. (# Pmt Escrowed) t= | 30 | <----# of Pmts Escrowed | |

FIG. 23

| | | | | | Check | TRUE |
|---|---|---|---|---|---|---|
| (0.00) | 530.60 | - | (530.60) | 4,977.36 | 1,132.22 | 4,782.01 | 10,891.59 |
| 0 | 530.60 | | | | | | |
| 1 | | | | 453.08 | 575.52 | | 1,028.60 |
| 2 | | | | 428.13 | 556.70 | | 984.83 |
| 3 | | | | 402.90 | - | | 402.90 |
| 4 | | | | 402.90 | - | | 402.90 |
| 5 | | | | 402.90 | - | | 402.90 |
| 6 | | | | 402.90 | - | | 402.90 |
| 7 | | | | 402.90 | - | | 402.90 |
| 8 | | | | 402.90 | - | | 402.90 |
| 9 | | | | 402.90 | - | | 402.90 |
| 10 | | | | 402.90 | - | | 402.90 |
| 11 | | | | 402.90 | - | | 402.90 |
| 12 | | | | 402.90 | - | | 402.90 |
| 13 | | (530.60) | | 67.15 | - | | 4,849.16 |

1= escrow req' lowered at next scheduled pmt / 0= same escrow

| Borrower CF | Investor CF | Net Cash to Inv |
|---|---|---|
| 9,999.99 | (10,530.59) | (530.60) |
| (1,000.00) | 1,028.60 | 28.60 |
| (1,803.18) | 984.83 | (818.35) |
| (330.64) | 402.90 | 72.26 |
| - | 402.90 | 402.90 |
| (330.64) | 402.90 | 72.26 |
| (330.64) | 402.90 | 72.26 |
| (330.64) | 402.90 | 72.26 |
| (330.64) | 402.90 | 72.26 |
| (330.64) | 402.90 | 72.26 |
| (330.64) | 402.90 | 72.26 |
| (330.64) | 402.90 | 72.26 |
| (5,112.65) | 5,379.76 | 267.11 |

DECENTRALIZED ARCHITECTURE FOR PROPERTY-BACKED VEHICLES AND CREATION, PUBLICATION, AND DISTRIBUTED INVESTMENT

CROSS-REFERENCE TO RELATED APPLICATIONS

This application claims priority to U.S. Provisional Patent Application No. 62/930,505, filed on Nov. 4, 2019 and entitled "ARCHITECTURE FOR CREATION, PUBLICATION, AND DISTRIBUTED INVESTMENT OF PROPERTY-BACKED VEHICLES", which is incorporated in its entirety herein by reference.

TECHNICAL FIELD

This disclosure pertains to secure systems for a centralized architecture for borrowers, individual and party investors for property backed assets and, more specifically, a centralized architecture for creation, publication, and distributed investment of property-backed loan vehicles.

BACKGROUND

Property owners seeking liquidity generally must go to a financial institution and arrange loan terms. The financial institution may fund the loan based on negotiated loan terms. Subsequently, the financial institution may generate income from the loan and provide the income to others that invest in the loan in the form of interest. The loan vehicle may be bundled with other loan vehicles and sold to other financial institutions or, alternately, derivatives based on the loans may be created for further risk distribution and/or income opportunities.

Traditional financial institutions do not allow a system whereby different potential, unrelated investors may discover different properties and property-backed loans that they may individually invest in. As a result, a traditional financial institution may undertake a loan that is secured by the real property, but individual, unrelated investors may not individually, intentionally, and specifically find an invest in that particular loan opportunity. Traditional financial institutions are monolithic and do not distribute or publish information regarding specific property-backed loan opportunities to others (e.g., particularly for loan opportunities of a relatively low amount of money such as $10 k, $50 k, $100 k, and $500 k).

Further, traditional financial institutions do not have a flexible architecture to publish and arrange in investment from multiple investors for each loan opportunity. As a result, investors lose options and flexibility. Further, by distributing the investment of the loan opportunity over specific investors that accept the risk and profit from the income, the financial institution may undertake unnecessary and, at times, unpredictable risk over any number of investments that can be transferred to individual investors.

Moreover, traditional financial institutions do not have the architecture to distribute interest and/or principal (e.g., returns) back to individual investors that invested in the loan opportunity.

SUMMARY

An example non-transitory computer readable medium comprises instructions that are executable by a processor. The instructions being executable to perform an example method. The method comprising receiving, from a first property owner system by an investment system, a first loan request to be secured by first property owned by a first user of the first property owner system, the first loan request including property information identifying the first property, the first property owner system being remote from the investment system, assessing a first value of the first property based, at least in part, on the property information of the first property, providing first loan terms to the first property owner system and requesting agreement, receiving a first agreement to the first loan terms from the first property owner system, publishing, by the investment system on a network, a first particular loan opportunity among a plurality of different loan opportunities, the first particular loan opportunity being based on the agreed first loan terms and the first property information, the plurality of different loan opportunities being searchable through an interface provided by the investment system, providing different loan opportunities of the plurality of different loan opportunities based on a first query received from remote systems, in response to receiving selections of the first particular loan opportunity from the plurality of different loan opportunities by a first investor system and a second investor system, providing details of the first particular loan opportunity including at least some of the property information identifying the first property to the first investor system and the second investor system, the first investor system and the second investor system being remote from each other and operated by a first investment entity and a second investment entity, respectively, receiving a first commitment from the first investor system to partially fund a loan amount associated with the first particular loan opportunity and a second commitment from the second investor system to partially fund the loan amount associated with the first particular loan opportunity, enabling a first loan to the first user when the loan amount associated with the first particular loan opportunity is completely funded, distributing, every day, daily returns to the first investing entity and the second investing entity, a first amount of the daily returns of the first investing entity being based on an amount of the first partial funding of the loan amount and a second amount of the daily returns of the second investing entity being based on an amount of the second partial funding of the loan amount, and receiving first loan payments from the first user and distributing the daily returns from the first loan payments.

The method may further comprise receiving a retention payment from first funds provided by the first investing entity and the second investing entity, the retention payment enabling providing of the daily returns to the first investment entity and the second investing entity until an initial loan payment of the first loan payments is received by the first user. In some embodiments, the method may further comprise retrieving a first agreement template from a plurality of agreement templates, populating the first agreement template based on an identity of the first user, an identity of the first investing entity, an identity of the second investing entity, the loan amount, the first loan terms, and the first property information to create a first agreement, providing the first agreement to the property owner system, the first investor system, and the second investor system, and receiving signed copies of the first agreement from the property owner system, the first investor system, and the second investor system, wherein enabling the first loan to the first user occurs after the signed copies are received.

In some embodiments, the method may further comprise receiving, from a second property owner system by the investment system, a second loan request to be secured by second property owned by a second user of the second property owner system, the second loan request including property information identifying the second property, the second property owner system being remote from the investment system and the first property owner system, the first user being different than the second user, assessing a second value of the second property based, at least in part, on the property information of the second property, providing second loan terms to the second property owner system and requesting agreement, receiving a second agreement to the second loan terms from the second property owner system, publishing, by the investment system on the network, a second particular loan opportunity among the plurality of different loan opportunities, the second particular loan opportunity being based on the agreed second loan terms and the second property information, the second particular loan opportunity being pending at a same time as the first particular loan opportunity, in response to receiving selections of the second particular loan opportunity from the plurality of different loan opportunities by a third investor system and a fourth investor system, providing details of the second particular loan opportunity including at least some of the property information identifying the second property to the third investor system and the fourth investor system, the third investor system and the fourth investor system being remote from each other as well as being remote from the first investor system and the second investor system, the third investor system and the fourth investor system being operated by a third investment entity and a fourth investment entity, respectively, the first, second, third, and fourth investment entities being different from each other, receiving a third commitment from the third investor system to partially fund a loan amount associated with the second particular loan opportunity and a fourth commitment from the fourth investor system to partially fund the loan amount associated with the second particular loan opportunity, enabling a second loan to the second user when the loan amount associated with the second particular loan opportunity is completely funded, distributing, every day, daily returns to the third investing entity and the fourth investing entity, a third amount of the daily returns of the third investing entity being based on an amount of the third partial funding of the loan amount and a fourth amount of the daily returns of the fourth investing entity being based on an amount of the fourth partial funding of the loan amount, and receiving second loan payments from the second user and distributing the daily returns from the second loan payments.

Enabling the first loan to the first user comprises providing instructions over the network to a financial institution to provide the first loan amount to the first user. In some embodiments, distributing, every day, daily returns comprises providing instructions over the network to the financial institution to provide the daily returns to the first investing entity and the second investing entity. In various embodiments, a facilitating entity that operates the investment system registers the first loan as a sole debtor.

The method may further comprise authenticating the first user of the first property owner system, the first investing entity of the first investor system, and the second investing entity of the second investor system, providing a communication channel among the first property owner system, the first investor system, and the second investor system for communication over the network, creating a secure record of communication in the communication channel among the first property owner system, the first investor system, and the second investor system, receiving a second query for the secure record from a requestor, the requestor being the first property owner system, the first investor system, or the second investor system, authenticating the second query, and providing the secure record upon authentication of the second query. In some embodiments, authenticating the second query comprises receiving an encryption key from the requestor to determine if the requester is authorized to receive the secure record.

In some embodiments, the method may further comprise generating a dashboard viewable by the first investor system over the network, the dashboard indicating daily payments made and future daily payments for any number of loans funded by the first investor entity using the investment system.

An example investment system may comprise at least one processor, a network interface to communicate over a network, and memory. The memory may include instructions to control the at least one processor to receive, from a first property owner system, a first loan request to be secured by first property owned by a first user of the first property owner system, the first loan request including property information identifying the first property, the first property owner system being remote from the investment system, assess a first value of the first property based, at least in part, on the property information of the first property, provide first loan terms to the first property owner system and requesting agreement, receive a first agreement to the first loan terms from the first property owner system, publish, on the network, a first particular loan opportunity among a plurality of different loan opportunities, the first particular loan opportunity being based on the agreed first loan terms and the first property information, the plurality of different loan opportunities being searchable through an interface provided by the investment system, provide different loan opportunities of the plurality of different loan opportunities based on a first query received from remote systems, in response to receiving selections of the first particular loan opportunity from the plurality of different loan opportunities by a first investor system and a second investor system, provide details of the first particular loan opportunity including at least some of the property information identifying the first property to the first investor system and the second investor system, the first investor system and the second investor system being remote from each other and operated by a first investment entity and a second investment entity, respectively, receive a first commitment from the first investor system to partially fund a loan amount associated with the first particular loan opportunity and a second commitment from the second investor system to partially fund the loan amount associated with the first particular loan opportunity, enable a first loan to the first user when the loan amount associated with the first particular loan opportunity is completely funded, distribute, every day, daily returns to the first investing entity and the second investing entity, a first amount of the daily returns of the first investing entity being based on an amount of the first partial funding of the loan amount and a second amount of the daily returns of the second investing entity being based on an amount of the second partial funding of the loan amount, and receive first loan payments from the first user and distributing the daily returns from the first loan payments.

An example method comprises receiving, from a first property owner system by an investment system, a first loan request to be secured by first property owned by a first user of the first property owner system, the first loan request including property information identifying the first property, the first property owner system being remote from the investment system, assessing a first value of the first property based, at least in part, on the property information of the first property, providing first loan terms to the first property owner system and requesting agreement, receiving a first agreement to the first loan terms from the first property owner system, publishing, by the investment system on a network, a first particular loan opportunity among a plurality of different loan opportunities, the first particular loan opportunity being based on the agreed first loan terms and the first property information, the plurality of different loan opportunities being searchable through an interface provided by the investment system, providing different loan opportunities of the plurality of different loan opportunities based on a first query received from remote systems, in response to receiving selections of the first particular loan opportunity from the plurality of different loan opportunities by a first investor system and a second investor system, providing details of the first particular loan opportunity including at least some of the property information identifying the first property to the first investor system and the second investor system, the first investor system and the second investor system being remote from each other and operated by a first investment entity and a second investment entity, respectively, receiving a first commitment from the first investor system to partially fund a loan amount associated with the first particular loan opportunity and a second commitment from the second investor system to partially fund the loan amount associated with the first particular loan opportunity, enabling a first loan to the first user when the loan amount associated with the first particular loan opportunity is completely funded, distributing, every day, daily returns to the first investing entity and the second investing entity, a first amount of the daily returns of the first investing entity being based on an amount of the first partial funding of the loan amount and a second amount of the daily returns of the second investing entity being based on an amount of the second partial funding of the loan amount, and receiving first loan payments from the first user and distributing the daily returns from the first loan payments.

An example non-transitory computer readable medium comprising instructions that are executable by a processor. The instructions may be executable to perform a method. The method may comprise providing, by a first property owner system to an investment system, a first loan request to be secured by first property owned by a first user of the first property owner system, the first loan request including first property information identifying the first property, the first property owner system being remote from the investment system, receiving first loan terms and a proposed first agreement by the first property owner system from the investment system, the loan terms being based on an assessment of first value of the first property by the investment system, the assessment being based, at least in part, on the property information of the first property, providing an indication of agreement to the first loan terms, receiving an indication that the investment system is publishing on a network site a first particular loan opportunity among a plurality of different loan opportunities, the first particular loan opportunity being based on the agreed first loan terms and the first property information, the plurality of different loan opportunities being searchable through an interface provided by the investment system, receiving, after a first period of time from the investment system, an indication that a loan based on the first loan terms has been funded by at least a first investor and a second investor, the first investor and the second investor having provided an agreement to fund different portions of the loan through investment system, the first investor and the second investor being remote from each other and being different entities, receiving, as directed by the investment system, a loan amount as indicated by the first loan terms, the investment system calculating and distributing daily returns to the first investor and the second investor based on their investment, prepaying a portion of the first loan amount, by the first property owner system, a first advanced payment of the loan, portions of the advanced payment being distributed by the investment system to the first and second investors, the investment system recalculating daily returns to account for the first advanced payment, and receiving an indication from the investor system that the first investor sold their investment in the loan to a third investor, whereby the investor system distributes future daily returns to the second and third investors.

The loan terms may require any loan agreement to be between an entity operating the investment system and the first property owner system. In some embodiments, the method may further comprise providing a query from the property owner to the investment system, receiving, by the property owner system, different loan opportunities of the plurality of different loan opportunities based on a first query, providing a selection of the first particular loan opportunity from the plurality of different loan opportunities by the property owner system to the investment system, receiving, by the property owner system from the investment system, details of the first particular loan opportunity including at least some of the property information identifying the first property, providing an agreement from the property owner to purchase an investment position from the second investor, and receiving distributions of daily returns, a second amount of the daily returns of the property owner being based on the investment position from the second investor.

In various embodiments, the method further comprises receiving a first agreement from the investor system, the first agreement being based on a first agreement template from a plurality of agreement templates, the investor system having populated the first agreement template based on an identity of the property owner, the loan amount, the first loan terms, and the first property information, and providing a signed copy of the first agreement from the property owner system. The property owner may receive the loan amount from a financial institution at the direction of the investment system. The property owner may receive daily distributions from a financial institution at the direction of the investment system.

The method may further comprise registering the first loan, the first loan indicating that entity operating the investment system is a sole debtor. In some embodiments, the method further comprises providing identification information to the investment system for authentication of the property owner by the investment system, utilizing a communication channel among the first property owner system, the first investor system, and the second investor system for communication over the network, providing new loan terms of the communication channel, the investment system creating a secure record of communication in the communication channel, providing a second query for the secure record from the property owner system, and receiving the secure record upon authentication of the second query. In some embodiments, the method further comprises providing an encryption key to the investment system to enable the investment system to determine if the property owner is authorized to receive the secure record.

In various embodiments, the method further comprises navigating, by the property owner system to the investment system and receiving a dashboard viewable by the property owner system, the dashboard indicating remaining amounts associated with the loan, payments, prepayments, and duration of loan daily payments made and future daily payments for any number of loans funded by the first investor entity using the investment system.

An example investment system comprises at least one processor, a network interface to communicate over a network, and memory. The memory including instructions to control the at least one processor to provide, by a first property owner system to an investment system, a first loan request to be secured by first property owned by a first user of the first property owner system, the first loan request including first property information identifying the first property, the first property owner system being remote from the investment system, receive first loan terms and a proposed first agreement by the first property owner system from the investment system, the loan terms being based on an assessment of first value of the first property by the investment system, the assessment being based, at least in part, on the property information of the first property, provide an indication of agreement to the first loan terms, receive an indication that the investment system is publishing on a network site a first particular loan opportunity among a plurality of different loan opportunities, the first particular loan opportunity being based on the agreed first loan terms and the first property information, the plurality of different loan opportunities being searchable through an interface provided by the investment system, receive, after a first period of time from the investment system, an indication that a loan based on the first loan terms has been funded by at least a first investor and a second investor, the first investor and the second investor having provided an agreement to fund different portions of the loan through investment system, the first investor and the second investor being remote from each other and being different entities, receive, as directed by the investment system, a loan amount as indicated by the first loan terms, the investment system calculating and distributing daily returns to the first investor and the second investor based on their investment, prepay a portion of the first loan amount, by the first property owner system, a first advanced payment of the loan, portions of the advanced payment being distributed by the investment system to the first and second investors, the investment system recalculating daily returns to account for the first advanced payment, and receive an indication from the investor system that the first investor sold their investment in the loan to a third investor, whereby the investor system distributes future daily returns to the second and third investors.

An example method comprises receiving, from a first property owner system by an investment system, a first loan request to be secured by first property owned by a first user of the first property owner system, the first loan request including property information identifying the first property, the first property owner system being remote from the investment system, assessing a first value of the first property based, at least in part, on the property information of the first property, providing first loan terms to the first property owner system and requesting agreement, receiving a first agreement to the first loan terms from the first property owner system, publishing, by the investment system on a network, a first particular loan opportunity among a plurality of different loan opportunities, the first particular loan opportunity being based on the agreed first loan terms and the first property information, the plurality of different loan opportunities being searchable through an interface provided by the investment system, providing different loan opportunities of the plurality of different loan opportunities based on a first query received from remote systems, in response to receiving selections of the first particular loan opportunity from the plurality of different loan opportunities by a first investor system and a second investor system, providing details of the first particular loan opportunity including at least some of the property information identifying the first property to the first investor system and the second investor system, the first investor system and the second investor system being remote from each other and operated by a first investment entity and a second investment entity, respectively, receiving a first commitment from the first investor system to partially fund a loan amount associated with the first particular loan opportunity and a second commitment from the second investor system to partially fund the loan amount associated with the first particular loan opportunity, enabling a first loan to the first user when the loan amount associated with the first particular loan opportunity is completely funded, distributing, every day, daily returns to the first investing entity and the second investing entity, a first amount of the daily returns of the first investing entity being based on an amount of the first partial funding of the loan amount and a second amount of the daily returns of the second investing entity being based on an amount of the second partial funding of the loan amount, and receiving first loan payments from the first user and distributing the daily returns from the first loan payments.

An example non-transitory computer readable medium may comprise instructions executable by a processor. The instructions may be executable to perform a method. The method may comprise navigating, using a first investor system, to a first investment interface on a network provided by an investment system, the investment system publishing on the first investment interface a first particular loan opportunity among a plurality of different loan opportunities, the first particular loan opportunity being based on first loan terms and first property information, the plurality of different loan opportunities being searchable through an interface provided by the investment system, the first property information identifying a property to secure a first loan of the first particular loan opportunity, the first particular loan opportunity being an opportunity to invest in the first loan and no other loans, the first terms being agreed upon by a first property owner seeking the first loan, the investment system having assessed a first value of the first property based, at least in part, on the property information of the first property, providing, from the first investor system, a first query to seek loan opportunities, receiving different loan opportunities of the plurality of different loan opportunities based on the first query, providing a selection of the first particular loan opportunity from the different loan opportunities, in response to the selections of the first particular loan opportunity from the plurality of different loan opportunities by the first investor system, receiving details of the first particular loan opportunity including at least some of the property information identifying the first property to the first investor system and receiving an indication of a second commitment to invest by a second investor in the first particular loan opportunity, the first investor system and a second investor system being remote from each other and operated by a first investment entity and the second investor, respectively, providing a first commitment from the first investor system to partially fund a first partial funding of a loan amount associated with the first particular loan opportunity, a second commitment from the second investor system being already provided to the investment system to partially fund a second partial funding of the loan amount associated with the first particular loan opportunity, receiving an indication that a first loan is to be provided to the first property owner when the loan amount associated with the first particular loan opportunity is completely funded, and receiving distributions, every day, of daily returns, a first amount of the daily returns of the first investor being based on an amount of the first partial funding of the loan amount of the first loan.

The method may further comprise receiving distributions of daily returns of the first investor on the first day that a loan associated with the first particular loan opportunity is provided. In some embodiments, the method may further comprise receiving an agreement to be signed by the first investor, second investor, and entity operating the investment system to agree to fund the loan and receive distributions, the agreement being populated based on an identity of the first property owner, an identity of the first investing entity, an identity of the second investing entity, the loan amount, the first loan terms, and the first property information to create a first agreement, and providing a signed copy of the agreement to the investment system.

In some embodiments, the method may further comprise navigating, by the first investor system, to the first investment interface on the network provided by the investment system, the investment system publishing a second particular loan opportunity of the plurality of loan opportunities, the second particular loan opportunity being for a second loan secured by second property owned by a second property owner of the second property owner system, second property information identifying the second property, the second property owner system being remote from the investment system and the first property owner system, the first property owner being different than the second property owner, the second particular loan opportunity being an opportunity to invest in the second loan and no other loans, the second terms being agreed upon by a second property owner seeking the second loan, the investment system having assessed a second value of the second property based, at least in part, on the property information of the second property, providing, from the first investor system, a second query to seek loan opportunities, receiving different loan opportunities of the plurality of different loan opportunities based on the second query, providing a selection of the second particular loan opportunity from the different loan opportunities, in response to the selections of the second particular loan opportunity from the plurality of different loan opportunities by the first investor system, receiving details of the second particular loan opportunity including at least some of the property information identifying the second property to the first investor system, providing a second commitment from the first investor system to partially fund a first partial funding of a loan amount associated with the second particular loan opportunity, receiving an indication that a second loan is to be provided to the second property owner when the loan amount associated with the second particular loan opportunity is completely funded, and receiving distributions, every day, of daily returns of the first investor, a second amount of the daily returns of the first investor being based on an amount of the first partial funding of the loan amount of the second loan.

The investment system may provide instructions over the network to a financial institution to distribute the daily returns. Receiving distributions, every day, of daily returns, may comprise receiving distributions, every day, of daily returns from a financial institution that received instructions from the investment system to provide the daily returns. A facilitating entity that operates the investment system may register the first loan as a sole debtor.

In various embodiments, the method further comprising authenticating the first property owner of the first property owner system, the first investor of the first investor system, and the second investor, providing a communication channel among the first property owner system, the first investor system, and the second investor system for communication over the network, creating a secure record of communication in the communication channel among the first property owner system, the first investor system, and the second investor system, providing a second query for the secure record from the first investor system, and receiving the secure record upon authentication of the second query. The method may further comprise providing an encryption key to determine if the first investor is authorized to receive the secure record.

The method may further comprise navigating to a dashboard viewable by the first investor system over the network, the dashboard indicating daily payments made and future daily payments for any number of loans funded by the first investor entity using the investment system.

An example investment system may comprise at least one processor, a network interface to communicate over a network, and memory, the memory including instructions to control the at least one processor to navigate to a first investment interface on a network provided by an investment system, the investment system publishing on the first investment interface a first particular loan opportunity among a plurality of different loan opportunities, the first particular loan opportunity being based on first loan terms and first property information, the plurality of different loan opportunities being searchable through an interface provided by the investment system, the first property information identifying a property to secure a first loan of the first particular loan opportunity, the first particular loan opportunity being an opportunity to invest in the first loan and no other loans, the first terms being agreed upon by a first property owner seeking the first loan, the investment system having assessed a first value of the first property based, at least in part, on the property information of the first property, provide a first query to seek loan opportunities, receive different loan opportunities of the plurality of different loan opportunities based on the first query, provide a selection of the first particular loan opportunity from the different loan opportunities, in response to the selections of the first particular loan opportunity from the plurality of different loan opportunities, receive details of the first particular loan opportunity including at least some of the property information identifying the first property and receiving an indication of a second commitment to invest by a second investor of a second investor system in the first particular loan opportunity, the first investor system and the second investor system being remote from each other and operated by a first investment entity and a second investment entity, respectively, provide a first commitment from the first investor system to partially fund a first partial funding of a loan amount associated with the first particular loan opportunity, a second commitment from the second investor system being already provided to the investment system to partially fund a second partial funding of the loan amount associated with the first particular loan opportunity, receive an indication that a first loan is to be provided to the first property owner when the loan amount associated with the first particular loan opportunity is completely funded, and receive distributions, every day, of daily returns, a first amount of the daily returns of the first investor being based on an amount of the first partial funding of the loan amount of the first loan.

An example method comprises navigating, by the first investor system, to the first investment interface on the network provided by the investment system, the investment system publishing a second particular loan opportunity of the plurality of loan opportunities, the second particular loan opportunity being for a second loan secured by second property owned by a second property owner of the second property owner system, second property information identifying the second property, the second property owner system being remote from the investment system and the first property owner system, the first property owner being different than the second property owner, the second particular loan opportunity being an opportunity to invest in the second loan and no other loans, the second terms being agreed upon by a second property owner seeking the second loan, the investment system having assessed a second value of the second property based, at least in part, on the property information of the second property, providing, from the first investor system, a second query to seek loan opportunities, receiving different loan opportunities of the plurality of different loan opportunities based on the second query, providing a selection of the second particular loan opportunity from the different loan opportunities, in response to the selections of the second particular loan opportunity from the plurality of different loan opportunities by the first investor system, receiving details of the second particular loan opportunity including at least some of the property information identifying the second property to the first investor system, providing a second commitment from the first investor system to partially fund a first partial funding of a loan amount associated with the second particular loan opportunity, receiving an indication that a second loan is to be provided to the second property owner when the loan amount associated with the second particular loan opportunity is completely funded, and receiving distributions, every day, of daily returns of the first investor, a second amount of the daily returns of the first investor being based on an amount of the first partial funding of the loan amount of the second loan.

BRIEF DESCRIPTION OF THE DRAWINGS

FIG. 11 is an investor dynamic graphical user interface (GUI) for an investor on an investor's digital device.

FIG. 12 is an investor dynamic graphical user interface (GUI) for an investor to research a property on an investor's digital device.

FIG. 22 depicts a spreadsheet for a calculation of a loan setup as an example.

FIG. 23 depicts a spreadsheet for payments over the life of the loan in an example.

DETAILED DESCRIPTION

Figure 1:
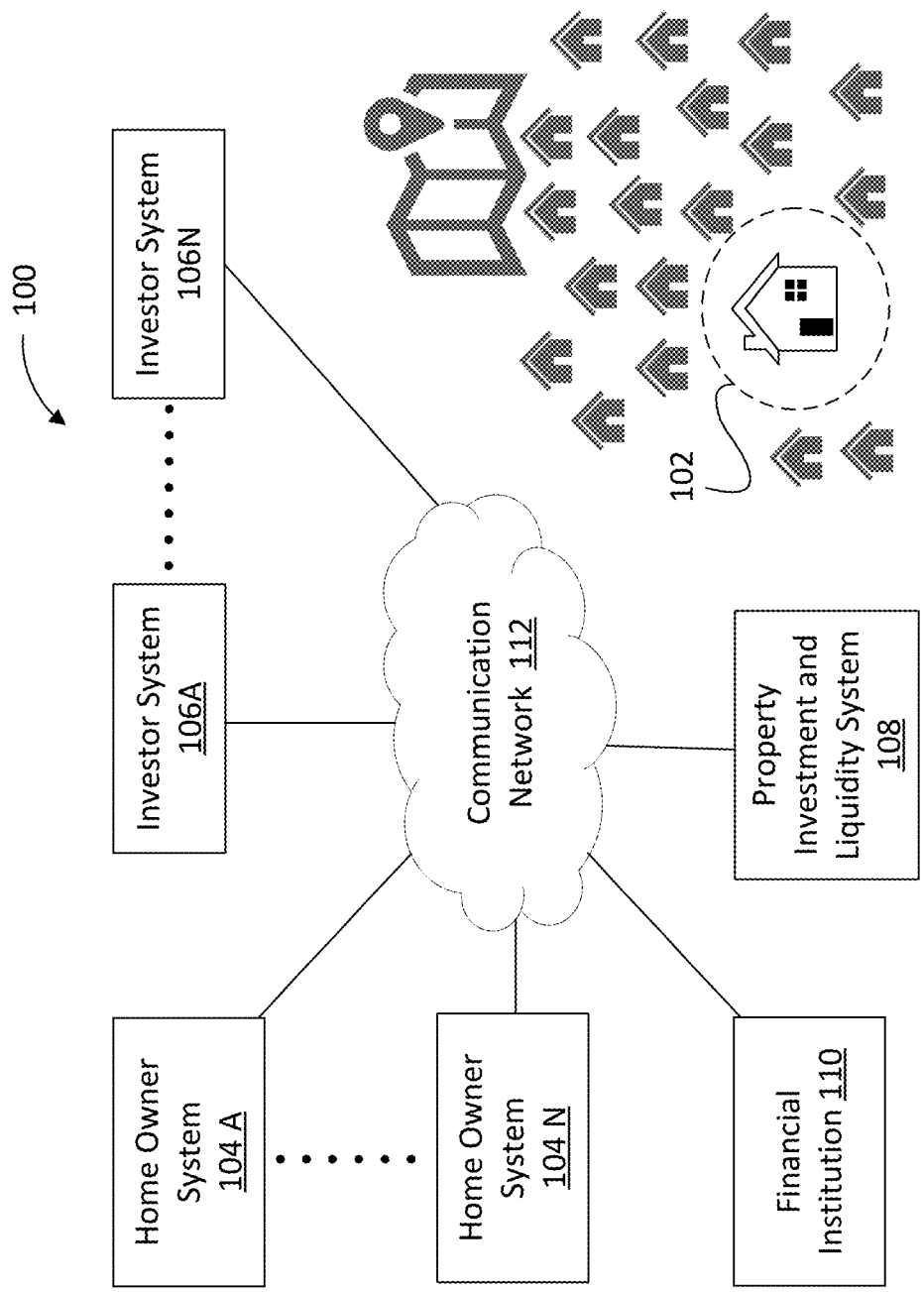
FIG. 1 is an environment for a property investment and liquidity system in some embodiments.

An example property investment and liquidity system enables property owners (e.g., homeowners) to access liquidity based on their property while enabling diverse investors to earn daily returns on investment in that property. In one example, a property owner may interact with the property investment and liquidity system over a network to investigate loan opportunities, including term, amount of loan, applicable rates, fees, and the like. If there is an acceptable loan opportunity, the property owner may list their property and loan information on the property investment liquidity system for investment. Any number of potential investors may access the property investment and liquidity system over the network to review possible properties and loan information for possible investment.

The property investment and liquidity system enables different, unrelated investors to search one or more properties and investment opportunities (as well as perform research on the property and/or the investment opportunity). An investor may select a property and a select an amount to invest into the desired loan of the property owner; a single investor may choose to invest only a portion of the desired loan. Once there is a commitment to fund the entire loan from the investor group (i.e., each investor of the group having committed to invest into the desired loan), the property investment and liquidity system may create the loan instrument as well as receive and transfer funds from the investors to the property owner. In some embodiments, the property is residential real estate, such as a home and related land.

In various embodiments, the property investment and liquidity system provides daily returns to each investor. The property investment and liquidity system may also enable the property owner to, at any time, pay down a portion of the loan (e.g., any amount of the loan or at least a minimum amount that is less than all of the loan) at any time during the life of the loan. The property investment and liquidity system may provide all or part of the property owner's pay down payment to the investors.

Investors may also choose to sell their portion of the investment or acquire additional portions of the investment from other investors. For example, a first investor may have originally committed to investing 15% of a property loan while a second investor may have originally committed to investing 7% of the property loan. The second investor may choose to sell half of their investment to the first investor. Using the property investment and liquidity system, the first investor may buy the investment from the second investor. After the transaction, the first investor may, in this example, have invested (e.g., own) 18.5% of the loan and the second investor may have invested (e.g., own) 3.5% of the loan. Subsequently, the property investment and liquidity system may update what daily returns to provide to the first and second investor based on the new loan investments.

In some embodiments, there may be a property investment exchange that enable different individuals to find and research investment opportunities based on the loans of the property investment and liquidity system. For example, the property investment exchange may enable different investors to indicate the value (e.g., investment and loan information) of their property investment. Individuals or any third-party entity may select and research opportunities and purchase any number of loan opportunities from any number of investors for any number of properties at rates published by the property investment exchange. It may be appreciated that pricing of investment opportunities may be reflected by the transactions and publications reflected in the property investment exchange.

FIG. 1 is an environment 100 for a property investment and liquidity system in some embodiments. FIG. 1 includes a property of interest 102, property owner systems 104A through 104N, investor systems 106A through 106N, a property investment and liquidity system 108, and a financial institution 110 that communicate over a communication network 112. The property owner systems 104A through 104N, investor systems 106A through 106N, and property investment and liquidity system 108 may each include one or more digital devices. A digital device is any device that includes at least one processor and memory. Digital devices are further discussed with regard to FIG. 24.

FIG. 1 depicts an example architecture of a system for: (1) researching loan opportunities for property owners, (2) for publishing loan opportunities across the network to unrelated investors for review, (3) for enabling investors to research and search loan opportunities in a centralized system, (4) for creating, providing, and collecting documents from property owners for loan creation and from investors for investing in a loan opportunity, (5) for collecting funds, distributing loan funds, and providing returns to the investor, and (6) for enabling investors to find, sell, and/or buy investments in existing loan opportunities.

In various embodiments, the property investment and liquidity system 108 is a centralized system that communicates with different property owners (e.g., home owner systems 104A-104N) and may be located anywhere in the world. As such, the property investment and liquidity system 108 may be a centralized system that allows different property owners to research, negotiate loans, enable loan documents to be created, receive loan documents, and/or facilitate funding. Further, the property investment and liquidity system 108 may enable property owners to prepay (e.g., pay extra) any amount of a loan early at any time.

The property investment and liquidity system 108 may utilize the same network and be a centralized system and/or server for publishing information regarding loan opportunities to interested potential investors. The interested potential investors may communicate with the property investment and liquidity system 108 using one or more investor systems 106A-106N. The investors may be unrelated to each other (e.g., from different, independent third-parties) and removed from each other.

An investor may utilize an application on their device and/or navigate to a web site with information from the property investment and liquidity system 108 (in some embodiments, the property investment and liquidity system 108 may host a web site and/or provide information to any number of applications on any number of investor systems).

Investors may research loan opportunities based on financial information (e.g., loan duration, rate, expected yield), borrower information (e.g., credit rating, financial history), property information (e.g., type of property, location of property, desirability of property, financial information of property (e.g., price of property, amount of preexisting debt secured by the property, history of property, features of the property), and/or any combination of the above. In one example, an investor using the investor system 106A may search using crafted queries a database of properties and/or loan opportunities (e.g., desired loans from property owners) for properties and/or loans of interest.

The property investment and liquidity system 108 may also, in some embodiments, control fund flows (e.g., to fund the loan for the property owner, receive payments form the property owner, and distribute returns to the investors) and/or may receive funds as well as control funds. In some embodiments, one or more financial institutions 110 may store funds and/or hold them in trust or escrow on behalf of the property investment and liquidity system 108 rather than the property investment and liquidity system 108 receiving money from different systems and/or individuals.

The property investment and liquidity system 108 may, in some embodiments, calculate daily returns to provide to investors once the loan is funded, provide daily returns, and enable borrowers to prepay any amount of the loan. If a borrower prepays an amount of the loan, the property investment and liquidity system 108 may split the prepayment among the investors based on their percentage funding of the loan, and recalculate daily returns to ensure that the daily returns are correct in view of the change.

Due to the centralization of the property investment and liquidity system 108, the property investment and liquidity system 108 enables investors and property owners to work together. The property investment and liquidity system 108 is centralized among the parties (e.g., loan borrower, property collateral, and investors) and, as a result, the property investment and liquidity system 108 may track investments, payments, percentage ownership of the loans, returns, and the like. As such, the life cycle of the investment has greatly improved security. For example, if there are multiple systems engaged in the process, a single attack in the middle of the system may damage the financial vehicle as well as any number of parties. In this example, the property investment and liquidity system 108 tracks all or most aspects of the loan thereby improving trustworthiness and security. Further, speed of the process of loan creation, publication, investment, payment, returns, and the like are improved by a centralized property investment and liquidity system 108 because parties of a decentralized architecture require individual, secured, authenticated relationships with consistent software and supported protocols.

As such, in a system where there are many unrelated parties for loan creation, funding, searching, and the like, investment property is subject to many processes that slow each individual loan. Further, banks or other financial institutions are not positioned to establish relationships with individual investors regarding a single loan opportunity. Rather, a financial institution will create opportunities through the grouping of loans into a derivative or ETF. While there is nothing wrong with the approach, individual borrowers are not allowed to partially prepay their loans, investors cannot choose to invest in a single, desirable property, and daily returns are simply not available without a centralized system such as that depicted in FIG. 1.

The property of interest 102 may be any real estate property. In many examples discussed herein, the property may be referred to as being a home property (e.g., residential). It may be appreciated that the property may be residential or commercial. Further, the property 102 may refer to a single real estate property or any number of real estate properties (e.g., a plurality of houses, apartments, condominiums, stores, warehouses, storage facilities, and/or the like). As depicted in FIG. 1, property or interest 102 may be a house of many houses located at a particular address.

In one example, a property owner may seek a loan secured by their residential property. The property owner may reach out to the property investment and liquidity system 108 to seek a loan. The property investment and liquidity system 108 may come to an agreement of terms regarding the loan and then publish the loan for individual, and remote investors to select the loan opportunity for investing. Once there is sufficient investment committed to service the loan, an operator (i.e., an entity) of the property investment and liquidity system 108 may enter into an agreement with the property owner. The property investment and liquidity system 108 and/or the operator may register the loan with the county registrar. In this example, the entity that operates or works with the property investment and liquidity system 108 is the registered entity that holds the property lien. The property investment and liquidity system 108 may facilitate funds from the investors to fund the loan and provide the loan to the property owner. Subsequently, the property investment and liquidity system 108 facilitates daily returns to the investors.

Figure 2:
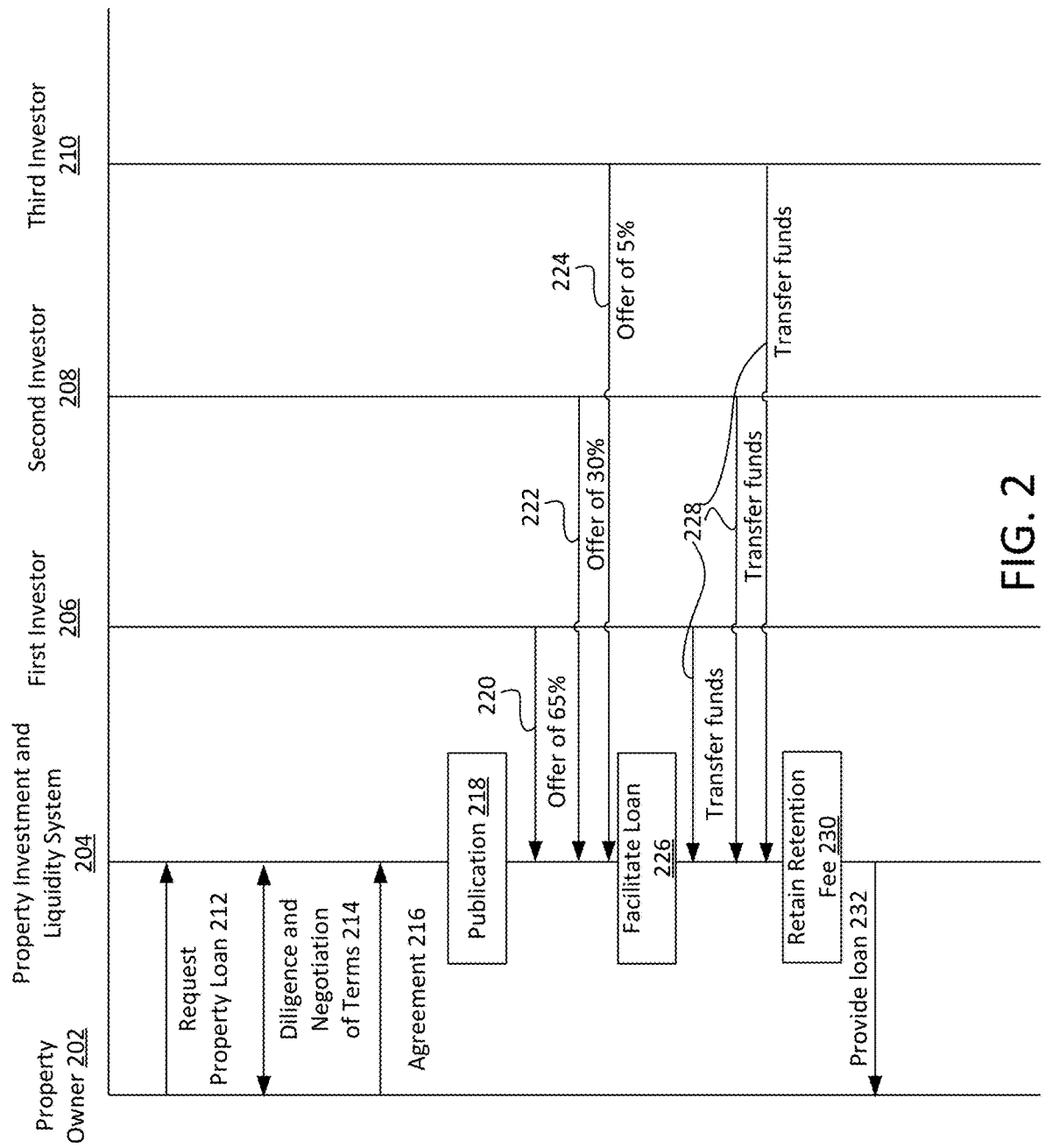
FIG. 2 depicts a flow chart for fulfilling a property investment opportunity in some embodiments.

FIG. 2 depicts a flow chart for fulfilling a property investment opportunity in some embodiments. FIG. 2 depicts a property owner 202 (e.g., utilizing home owner system 104A), a property investment and liquidity system 204, a first investor 206, a second investor 208, and a third investor 210. The property investment and liquidity system 204 may be, for example, property investment and liquidity system 108. The first, second, and third investors 206, 208, and 210 may interact with the property investment and liquidity system 204 utilizing investor systems 106A, 106B, and 106C, respectively. Although FIG. 2 depicts a single property owner 202 and three investors, it may be appreciated that there may be any number of home owners that own any number of properties and any number of investors.

In step 212, the property owner 202 (e.g., via the home owner system 104a) may navigate over the communication network 112 to communicate with the property investment and liquidity system 204 to request a loan backed by a property owned, in whole or part, by the property owner 202. The property owner 202 may provide property information. Property information may include, for example, address, type of property (e.g., house, commercial, or the like), and features or property (e.g., number of bedrooms, bathrooms, square feet, views, updates, pool, heating, air conditioning, and the like). The property owner 202 may provide property finance information such as purchase price, value of similar homes in the area, home improvements, history of property (e.g., physical changes, destruction, damage, changes to real estate close to property, and/or the like), and/or financial history (e.g., past purchase amounts, preexisting loans, liens, easements, encumbrances, and/or the like).

In step 214, the property investment and liquidity system 204 may perform diligence of the property and negotiate loan terms with the property owner 202. For example, the property investment and liquidity system 204 may perform a title search on the property to confirm ownership (e.g., to confirm property owner 202 is the owner of the property) as well as determine past purchase amounts, preexisting loans, liens, easements, encumbrances, and/or the like).

The property investment and liquidity system 204 may also determine equity in the house, assess debt and evaluate the investment opportunity. The property investment and liquidity system 204 may negotiate terms with the property owner 202 regarding duration of loan, amount, rates, fees, opportunities for prepayments, discuss expectations, and/or the like. in some embodiments, the property investment and liquidity system 204 may not negotiate any of the terms of the loan opportunity and may only provide loan terms that are acceptable to property investment and liquidity system 204.

In step 216, an agreement is made between the property owner 202 and the property investment and liquidity system 204.

In step 218, the property investment and liquidity system 204 presents pictures of the property and information regarding the property and the loan opportunity to interested potential investors. All or a part of the property information may be provided, as well as financial information regarding the purchase price of the property, existing debts and/or encumbrances, past prices for the property, and the like. Further the property investment and liquidity system 204 may provide investment information including the amount of loan requested, the rate, expected yield, duration of loan, and/or the like.

In some embodiments, the property investment and liquidity system 204 may estimate or prepare hypothetical rates which may be provided to the property owner with a request of their interest in the opportunity. The property owner may respond with their interest in the loan based on an estimated or hypothetical rate. The property investment and liquidity system 108 may indicate the property owner's interest as well as the rates of interest. The property investment and liquidity system 108 may estimate a rate for the property based on similar properties in the community proximate to the property, based on the local economy, based on the state of local real estate, based on new or moving businesses in the area, based on natural disasters, based on property improvements, and/or the like.

In various embodiments, the property investment and liquidity system 204 may provide an interface depicting any number of properties and investment opportunities to any number of potential investors. In one example, investors may utilize the communication network 112 to communicate with the property investment and liquidity system 204, review opportunities, and consider investment. In some embodiments, the property investment and liquidity system 204 provides a search interface that enables the investors to search for particular property opportunities (e.g., houses with 4 bedrooms or more, within a particular region, built at or after a certain date and/or the like) and/or search for particular investment opportunities (e.g., an investment opportunity for over or under a predetermined amount, for a particular loan duration, for under a particular loan duration, at or above a particular rate, at or above a particular yield, and/or the like).

Different investors may review the investment opportunity and conduct research (e.g., independently and/or through the property investment and liquidity system 204) on the investment opportunity.

In one example for FIG. 2, the property owner 202 desires a $100 k loan using his $500 k home as collateral. The home has an existing mortgage with a current value of $200 k. The property owner may wish for a one year loan at a rate of 7.9%. Any number of investors may invest any amount until the desired loan of $100 k is reached.

In step 220, a first investor 206 offers an investment of 65% of the loan. In this example, the first investor 206 offers an investment of $65 k. In step 222, a second investor 208 offers an investment of 30% of the loan or an investment of $30 k. In step 224, the third investor 210 offers to complete the investment of 5% or $5 k. Each investor may be aware of any portion committed by another investor (although they may or may not be aware of the investor's identity).

It may be appreciated that an investor may be an individual, institution, organization, or the like.

In step 226, once investors have committed investment of the full amount of the loan, the property investment and liquidity system 204 facilitates the loan by creating the necessary documents, filing updates to title, and/or the like. The property investment and liquidity system 204 may contact the property owner 202 to inform them that the loan has been funded and provide additional confirming loan information such as date that the loan will be funded, duration of loan, dates for payment, and/or the like. Similarly, the property investment and liquidity system 204 may contact each investor to inform them of similar information.

In step 228, the first investor 206, second investor 208, and third investor 210 each transfer funds to the property investment and liquidity system 204. In some embodiments, the property investment and liquidity system 204 does not receive the funds but rather the funds are received and/or held by a third-party such as a financial institution.

In step 230, the property investment and liquidity system 204 may retain a retention payment. The retention payment is further discussed herein. In some embodiments, the property investment and liquidity system 204 may retain a first month payment of the loan at the inception of the loan in order to provide daily returns to the investors in the first month of the loan. The retention payment may include fees for services, and/or the like as well.

In step 232, the property investment and liquidity system 204 provides the loan proceeds (e.g., the funds without the retention payment) to the property owner 202.

Figure 3:
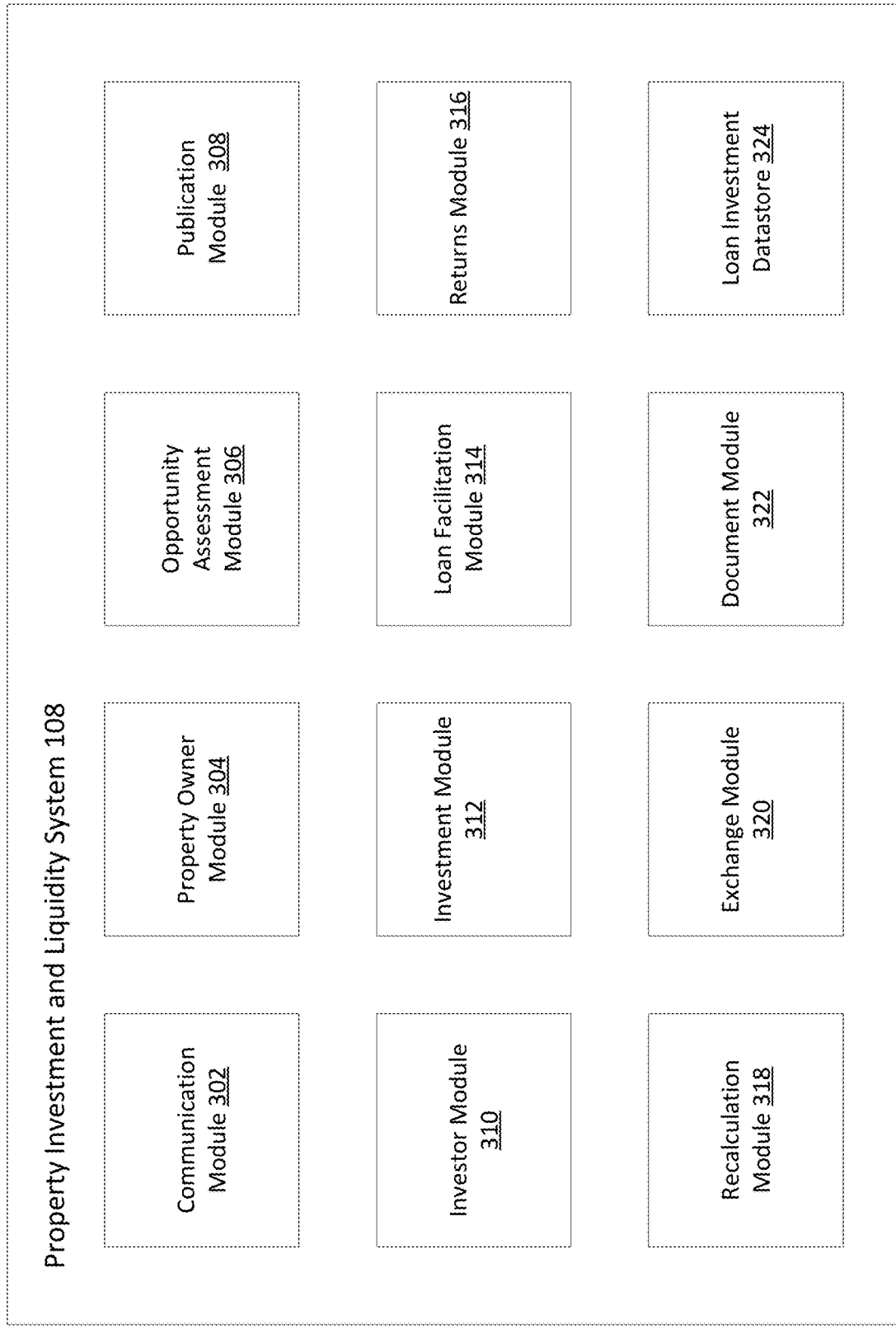
FIG. 3 depicts a property investment and liquidity system in some embodiments.

FIG. 3 depicts a property investment and liquidity system 108 in some embodiments. The property investment and liquidity system 108 includes a communication module 302, a property owner module 304, an opportunity assessment module 306, a publication module 308, an investor module 310, an investment module 312, a loan facilitation module 314, a periodic returns module 316, a recalculation module 318, an exchange module 320, a document module 322, and a loan investment data store 324.

The communication module 302 may be configured to communicate with any of the home owner systems 104A through 104N, and in the investor systems 106A through 10N, and or optional financial institution 110 via the communication network 112. The communication module 302 may also enable communication between modules, the loan investment data store 324, external systems, external data stores, and/or the like.

The property owner module 304 may be configured to enable property owners to communicate with the property investment and liquidity system 108, provide property information, provide loan information (e.g., such as the amount of loan that they wish, the duration of the loan, rate of the loan, and the like), negotiate a loan opportunity with the property investment and liquidity system 108, research terms for similar loans for similar properties, provide current financial information regarding the property and/or the homeowner, sign agreements and representations, receive loan funds, provide payments, and/or the like.

Figure 4:
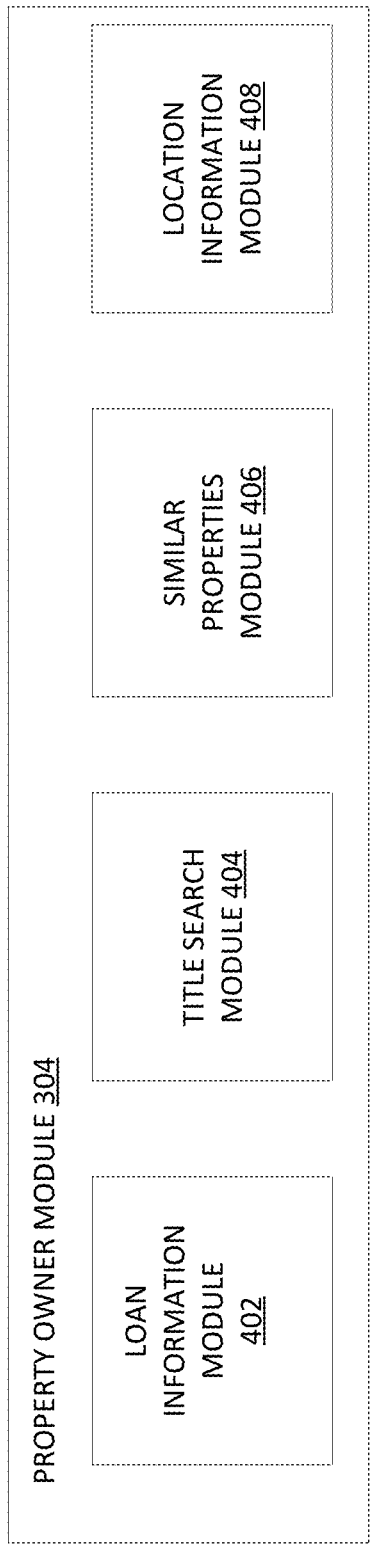
FIG. 4 depicts an example, property owner module in some embodiments.

The property owner module 304 is further discussed regarding FIG. 4.

The opportunity assessment module 306 may be configured to assess loan opportunities from the property owner, provide required rates, assess property information, assess loan information, determine fees (e.g., retention payments), and/or the like. In various embodiments, the opportunity assessment module 306 is utilized to construct a loan opportunity for negotiation or for acceptance by the property owner based on the information provided by the property owner. Further, the opportunity assessment module 306 may construct a loan opportunity also based on similar properties, similar loans, historical data regarding the homeowner, similar homeowners, risk categories, and/or the like.

The publication module 308 may be configured to provide graphical user interfaces to receive information from the property owner, enable searching of similar properties in similar loans to the property owner and or investors, and provide listings of available loan opportunities as well as the properties that secure those loan opportunities. In various embodiments, the publication module 308 enables the property owner and or investors to search a database of properties and or loan opportunities for research on investments and/or to find investments to invest in.

For example, the publication module 308 may provide a website or information to website that enables property owners and/or investors to search loan opportunities or established loans as well as properties that back loan opportunities were established loans. The publication module 308 may publish pictures, addresses, and information regarding the property such as property values, values over time, locations of the property on a map, graphs regarding demographics and financial opportunity in the area, and the like. Example information published by the publication module 308 is depicted in FIGS. 10-16.

The investor module 310 may be configured to enable investors to register with the property investment and liquidity system 108, search property and loan opportunities through graphical user interfaces published by the publication module 308, investigate a dollar amount available in one or more loan opportunities for investment, research yields and rates, review duration of possible loans, research property, and/or the like. The investor module 310 may be configured to enable investors to commit to investing in one or more loan opportunities by enabling them to review and sign agreements and make a financial transaction that may ultimately be used to fund the loan.

The investment module 312 may be configured to perform real time investment tracking including when investors invest in a loan opportunity, amount of investment, interest in additional investors for each loan opportunity, and the like. In various embodiments, the investment module 312 tracks payments from the borrower in real time, payments from retention payment and money held in trust to investors, and overall balances.

The loan facilitation module 314 may be configured to facilitate receipt of funds to fund the loan, provide funds to the property owner, retain retention payments, enable returns to investors, track investors, and/or the like. In some embodiments, the loan facilitation module 314 may be configured to communicate with one or more financial institutions including, for example, a financial institution associated with the property owner, and financial institutions associated with one or more investors.

Figure 5:
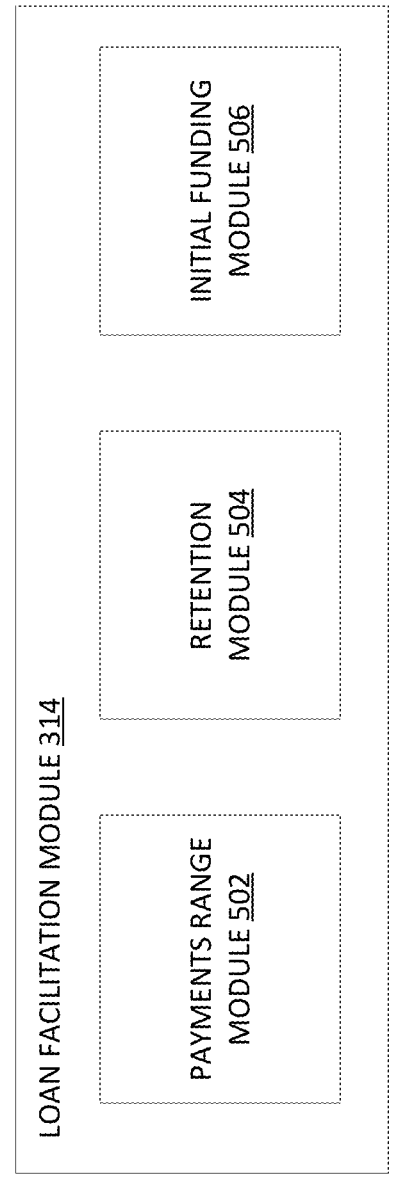
FIG. 5 is an example loan facilitation module in some embodiments.

The loan facilitation module 314 is further described in FIG. 5.

The returns module 316 may be configured to calculate daily returns for each investor based on the loan amount, rates, duration of loan, number of investors, percentage of loan that each investor funded, and/or the like. In various about it is the loan facilitation module 314 may utilize returns information from the returns module 316 to distribute daily returns to any number of investors regarding a particular loan.

The recalculation module 318 may be configured to recalculate daily returns based on receipt of the prepayment from the property owner. For example, a property owner may receive a loan for a particular some. At some point, the property owner may pay back a larger portion of the fund than what was due at that particular time. The recalculation module 318 and/or the returns module 316 may recalculate the daily returns for any number of investors based on the change in the outstanding loan amount.

The exchange module 320 may be configured to enable and investor to sell their position and alone (e.g., all or part of their investment) to one or more other investors. For example, an investor may have initially invested 20% of the total loan amount in a particular loan opportunity. That investor may sell their full position to another investor in exchange for payment.

In various embodiments, the exchange module 320 may operate a centralized exchange that lists existing loans, positions of investors, price for the position of each investor that lists their loan with the exchange, and the like. In various embodiments, the exchange module 320 may offer derivatives or ETFs based on investor's particular positions. For example, a financial vehicle may be created based on all or some of a particular investor's particular investments, particular types of properties, particular types of loans, or the like. Pricing for listed existing loans, investor investments, financial vehicles, and the like may be based on a previous purchase or purchases of similar financial opportunities.

It may be appreciated that there may be any number of modules of the property investment and liquidity system 108. For example, there may be more modules that perform all or more of the functions discussed regarding FIG. 3. In another example, there may be less modules that perform all, less, or more of the functions discussed regarding FIG. 3.

FIG. 4 depicts an example, property owner module 304 in some embodiments. The property owner module 304 comprises a loan information module 402, a title search module 404, a similar properties module 406, and a location module 408. The loan information module 402 is configured to receive property information and loan proposal information from a property owner.

In various embodiments, a property owner may register with the property investment and liquidity system 108. The property owner may provide identification information, property information, a password and the like. The property investment and liquidity system 108 may confirm ownership of the property (e.g., through a title search) and/or other confirming information.

The loan information module 402 may be configured to interact with a property owner regarding a particular property and/or loan opportunity. In one example, a property owner may communicate with the loan information module 402 of the property investment and liquidity system 108 via communication network. The property owner may utilize an application or web browser to communicate with the property investment and liquidity system 108.

The loan information module 402 may provide an interface such as a graphical user interface to the property owner requesting property information such as address of the property, last assessed value of the property, purchase price for the property, history of pricing for the property, features of the property, location of the property, improvements to the property, liabilities associate with the property, or the like. The loan information module 402 may further request in the interface information regarding the borrower including, for example, legal name, birthdate, identification information (e.g., driver's license number, passport information, photographs of driver's license, photograph of passport pages), and the like.

The loan information module 402 may further request information regarding the financial health the borrower including, for example, credit score, amount of debt, any existing encumbrances or liens on the property, income, income history of the borrower, income produced by the property, judgments against the property or the borrower, or other information that may indicate financial risk or health of the borrower.

The title search module 404 may be configured to perform a title search on the property in question to confirm ownership of the property, past encumbrances of the property, blemishes of title, liabilities, or the like. In some embodiments, the title search module 404 may be configured to update titles of properties when loans are created.

The title search module 404 may be configured to receive address information and/or any other information regarding the property in question. The title search module 404 may engage one or more title databases to retrieve information regarding the property including title history, changes in ownership, and the like. In some embodiments, the title search module 404 may send email or other contact information to title search companies to engage with searching and clearing title of these properties.

The similar properties module 406 may be configured to assist in the search of other similar properties. For example, the similar properties module 406 may be configured to search similar properties in specific locations, similar locations, or the like. The similar properties module 406 may highlight similarities between properties including pricing of similar properties changes in value over time differences between properties that may influence risk reward or the like.

The similar properties module 406 may utilize any number of public databases to search for similar properties. For example, property information may include the type of property, number of rooms, square footage, year built, use of the property, size of lot, and other features may be utilized to formulate queries into property public databases to retrieve information regarding properties that may be similar for one or more of the above characteristics.

It may be appreciated that there may be any number of modules of the property owner module 304. For example, there may be more modules that perform all or more of the functions discussed regarding FIG. 4. In another example, there may be less modules that perform all, less, or more of the functions discussed regarding FIG. 4.

FIG. 5 is an example loan facilitation module 314 in some embodiments. The loan facilitation module 314 may include a payments range module 502, a retention module 504, and an initial funding module 506. The payments range module 502 may be configured to create a loan payment and amortization schedule (e.g., calculated daily) for each investor. Because each day's payment is more or less the same as the previous day's, the borrower may pay every 30 days while the investor gets a smooth stream of daily payments.

The retention module 504 determines fees paid to the service as well as an initial retention payment that may be held in trust or escrow. The retention payment may be held before the borrower receives the loan funds. Daily payments to the investors may come from the retention payment (e.g., from trust or escrow). As daily payments are made, the money from the retention payment is reduced. The borrower's first payment may go into the same trust or escrow used to store the retention payment. Thereafter, the money from the first payment may then be used pay the investors daily returns until the borrower's next payment.

The initial funding module 506 may be configured to break down an initial loan amount into shares (1 penny per share). Subsequent cashflow splits may be based on an investors' ownership amounts. The initial funding module may split principal payments every day for payment to the nearest penny rounded down. Interest payments may also be split every day and paid out to the nearest penny rounded down.

In some embodiments, the initial funding module 506 may calculate changes in loan payouts if the borrower makes an additional unscheduled payment.

The payment process is further discussed herein.

It may be appreciated that there may be any number of modules of the loan facilitation module 314. For example, there may be more modules that perform all or more of the functions discussed regarding FIG. 5. In another example, there may be less modules that perform all, less, or more of the functions discussed regarding FIG. 5.

Figure 6:
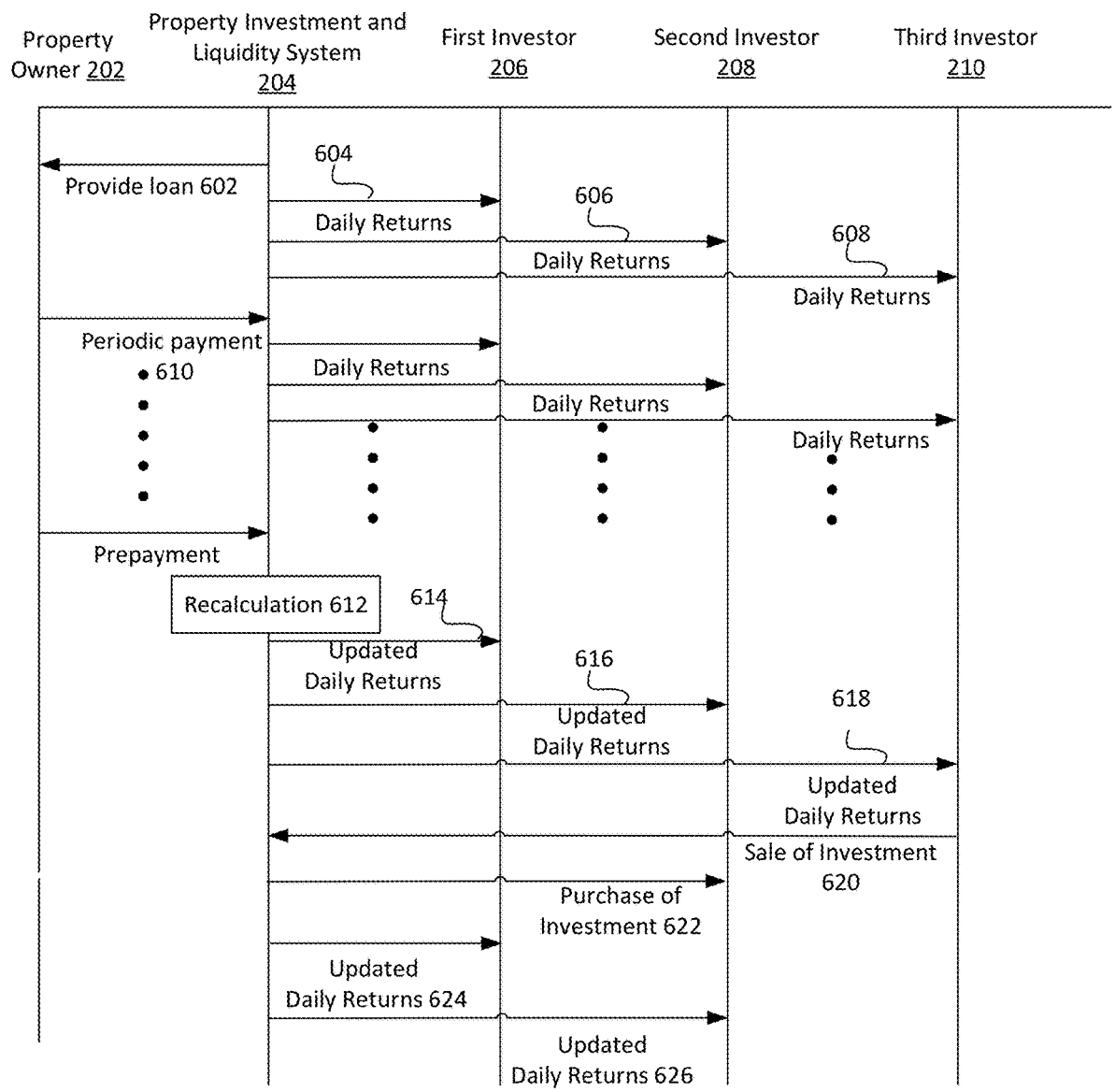
FIG. 6 is a flowchart for paying returns to investors in some embodiments.

FIG. 6 is a flowchart for paying returns to investors in some embodiments. In step 602, the loan facilitation module 314 may provide funding for the property owner's loan to the property owner 202. In this example, the property owner 202 may have interacted with the property owner module 304 to describe the property, provide property information, provide borrower information, and provide financial information for the desired loan. The opportunity assessment module 306 may have assessed the property and the terms of the potential loan. The opportunity assessment module 306 may further assist in negotiation with the property owner 202 and/or communication the property owner 202 to ensure that the property owner 202 understands the risks and opportunities involved. In some embodiments, the opportunity assessment module 306 and/or the title search module 404 of the property owner module 304 may perform a title search of the property, confirm debts or encumbrances related to the property, assess the quality and value of the property, and/or the like.

If the property owner 202 accepts the loan terms the property owner module 304 may generate forms or documents to create the loan opportunity. In some embodiments, the property owner module 304 retrieves one or more agreement templates and populates fields of the agreement templates based on the property information, borrower information, amount of loan requested, duration of loan, rates, and/or the like. The property owner module 304 may provide the documents electronically to the property owner 202 to enable the property owner 202 to review the documents, ask any questions, and the like. The property owner 202 may, in some embodiments, physically or digitally sign the documents and return the documents electronically back to the property owner module 304 which may save them in the document module 322 or the loan investment data store 324.

Further, in this example, the publication module 308 may publish details of the property that backs the loan (e.g., address, location, value, characteristics of the property, and the like), loan information (e.g., rates, amount requested, duration of loan), borrower information (e.g., borrower name, credit risk, and/or signed documents), and the like. The publication module 308 may enable investors to review multiple different properties and flip through various cards related to properties and loan opportunities to search for desirable potential opportunities.

In this example, the first investor 206 may have invested 40% of the loan, the second investor 208 may have invested 35% of the loan and the third investor 210 may have invested 25% of the loan. Once funds have transferred from the investors to the property investment and liquidity system 204, the loan facilitation module 314 may take out a retention payment from the funds provided from the investors. All or some of the retention payment may be stored in trust or escrow and used to pay daily returns back to the first, second, and third investors 206 through 210.

It will be appreciated that, in some embodiments, the investment module 312 or the loan facilitation module 314 may calculate the total value of the loan to provide to the borrower as well as the retention payment necessary to pay the investors during a first pay period before the property owner 202 has provided the first payment. The property investment and liquidity system 204 may then publish an amount of the requested loan which includes the amount of the loan desired by the property owner 202 as well as the retention payment.

In step 602, the loan facilitation module 314 provides the desired loan amount to the property owner 202. In various embodiments, the loan facilitation module 314 may provide the desired loan amount to a financial institution of the property owner 202 or generate a check to be mailed to the property owner 202.

In step 604, the returns module 316 may provide the first day daily returns to the first investor 206. Similarly, in step 606, the returns module 316 may provide the first day daily returns to the second investor 208. In step 608, the returns module 316 may provide the first day daily returns to the third investor 210. The amount of the return for each investor may be based on the percentage of the loan that the investors invested.

In step 610, periodic payments are paid from the property owner 202 to the property investment and liquidity system 204. In some embodiments, the property owner 202 orders their financial institution to provide periodic payments to the property investment and liquidity system 204. The periodic payments may be based on any period, but may be, more commonly, at 30 day periods. As discussed herein, the property investment and liquidity system 204 may provide returns to the investors on a daily basis in spite of the periodic nature of the payments from the property owner 202.

FIG. 22 depicts a spreadsheet for a calculation of a loan setup as an example. In this example, the target net loan amount of $10,000. The total amount of the loan is calculated to be $10,530.59 with a retention payment of $530.60 for net loan amount of $9999.99 (that would go to the borrower). The duration of the loan is determined to be one year (e.g., 365 days). Amortization of the loan is calculated for two years with an annual interest rate of 5% in a daily rate of 0.014% for each day of 365 days. As a result, the payment per day (e.g., return for one share of the loan) is calculated to be 15.16 cents. In upfront escrow for the buffer would be 35 payments.

The property investment and liquidity system 108 calculates the full value of the loan (e.g., desired amount by the borrow and the retention payment) using:

$$PV = \frac{FV_1}{\left(1 - \left(\frac{r}{1-(1+r)^{-n}}\right) * t\right)}$$

Where "PV" is the loan amount, "FV1" is the amount the borrower needs, "r" is the interest rate, "t" is the number of days (e.g., ranging 30-35 days for the retention payment), an "n" may be a term of amortization measured in days.

FIG. 23 depicts a spreadsheet for payments over the life of the loan in an example. The loan in FIG. 22 is the same as the loan in FIG. 21. FIG. 22 shows 14 escrow periods starting from period zero and ending in period 13. The initial escrow is $530.60. The borrower makes payments to the property investment and liquidity system 108 in periods 1 through 13.

In the period 0 until period 1, the property investment and liquidity system 108 pays daily returns to the investors from the initial escrow funded by the retention payment. The first payment is received by the borrower on period 1 (e.g., thirty days). In this example, the borrower makes a payment of $453.08 but also makes an additional payment of $575.52. The property investment and liquidity system 108 puts all or some of the payment of $453.08 in trust/escrow which is then used to fund daily returns to the investors. The additional payment may be distributed to the investors as a one-time lump sum. The property investment and liquidity system 108 may recalculate payments and/or daily return payments based on the early payment. In some embodiments, early payment does not shorten the duration of the loan, but rather may reduce the monthly payment of the borrower, reduce any balloon payment at the end of the loan, and/or change the daily returns to the investors (e.g., since they already received their portion of the lump sum payment).

Similar to period 1, in period 2 (e.g., day 60), the borrower pays $428.13 and makes an additional prepayment of $556.70. The property investment and liquidity system 108 puts all or some of the payment of $428.13 in trust/escrow which is then used to fund daily returns to the investors. The additional payment may be distributed to the investors as a one-time lump sum. The property investment and liquidity system 108 may recalculate payments and/or daily return payments based on the early payment.

For periods 3-12, the borrower continues to make payments on time and in the last period (period 13), the borrower makes a final payment as well as a balloon payment to the property investment and liquidity system 108. The funds are distributed to the investors and the loan may be satisfied. In various embodiments, the property investment and liquidity system 108 may provide a certificate or other documentation to confirm that the loan is satisfied, may contact financial institutions and credit rating agencies regarding the satisfaction of the loan, may confirm the end of the loan with investors, and may make notices of satisfaction of the loan on titles or other real estate services.

Returning to FIG. 6, daily returns continue to be paid from the periodic payments of the property owner 202.

In step 612, the borrower may make an advance prepayment (e.g., in addition to the periodic payment). The recalculation module 318 may recalculate the amount of periodic payments moving forward for the borrower as well as the amount of daily returns to the investors. The returns module 316 may distribute all or parts of the prepayment to each of the investors based on the percentage of investment of the loan that that particular investor makes.

In steps 614-618, the returns module 316 provides updated daily returns to the first investor 206, the second investor 208, and the third investor 210, respectively.

In step 620, the third investor 210 determines to sell their portion of the investment in the existing loan to second investor 208. It may be appreciated that an investor may sell all or part of their investment to another investor that is already investing in the same loan or to a different investor that has not previously funded a part of the particular loan.

In some embodiments, the third investor 210 may choose to list their investment in the particular loan using an exchange or through publication of the publication module 308. In this example, the second investor may have been looking for an opportunity to make additional investments into the loan for this particular property and, in searching publications from the publication module 308 using a search query, the second investor 208 may discover the investment opportunity from third investor 210, and make the purchase.

The property investment and liquidity system 108 is still the center of the system and, as a result, can match the two investors together and further control investments calculations and returns while preventing unknown or untrusted other parties that can be a problem with decentralized systems.

In another example, the second investor 208 may desire to increase their investment in a particular property. In this example, the second investor 208 may publish an offer to purchase all or part of the investment of another investor in the property. Alternately, the second investor 208 may reach out to the third investor 210 to discuss acquiring all or part of the third investor's position in the loan.

In one example, a property owner may seek a loan secured by their residential property. The property owner may reach out to the property investment and liquidity system 108 to seek a loan. The property investment and liquidity system 108 may come to an agreement of terms regarding the loan and then publish the loan for individual, and remote investors to select the loan opportunity for investing. Once there is sufficient investment committed to service the loan, an operator (i.e., an entity) of the property investment and liquidity system 108 may enter into an agreement with the property owner. The property investment and liquidity system 108 and/or the operator may register the loan with the county registrar. In this example, the entity that operates or works with the property investment and liquidity system 108 is the registered entity that holds the property lien. The property investment and liquidity system 108 may facilitate funds from the investors to fund the loan and provide the loan to the property owner. Subsequently, the property investment and liquidity system 108 facilitates daily returns to the investors.

In various embodiments, the investor with the largest stake in the loan may have additional rights under the agreement(s) through the property investment and liquidity system 108. In one example, if there is a default on the loan and the property becomes available in satisfaction of the loan (i.e., a foreclosure), the investor with the largest stake (e.g., the largest invested amount in the loan) may receive or have the opportunity to purchase the property. This may incentivize an investor to increase their investment in order to be in a position to receive a desirable property and/or control negotiation. In this example, the second investor 208 may become the largest investor once the investment from the third investor 210 is purchased.

In one example of a foreclosure, an entity associated with or operating the property investment and liquidity system 108 may come to an agreement of terms regarding the loan and then publish the loan for individual, and remote investors to select the loan opportunity for investing. Once there is sufficient investment committed to service the loan, an operator (i.e., an entity) of the property investment and liquidity system 108 may enter into an agreement with the property owner. The property investment and liquidity system 108 and/or the operator may register the loan with the county registrar. In this example, the entity that operates or works with the property investment and liquidity system 108 is the registered entity that holds the property lien. If there is a default, the entity may negotiate to work out an arrangement between the property owner and the investors.

Additionally or alternatively, the investors may negotiate with the property owner. Traditionally, a bank that may foreclose on a loan may be restricted to communicate with the debtor by registered mail. In this example, the property investment and liquidity system 108 may create a secured chat or other digital communication. The property investment and liquidity system 108 may require the property owner and each investor to log into the system and/or provide credentials to confirm their identity. The property investment and liquidity system 108 may log all information of the secured chat and/or other digital communication including communications. The property investment and liquidity system 108 may also encrypt and/or create checksums of the conversation to confirm that the chat and/or other digital communication cannot be later altered. The logged and secured communication can then provide a foundation for security and confirmation of agreement between the parties.

The property investment and liquidity system 108 may change the terms of the loan, payouts, and/or the like based on the agreement (if any) between the parties. In some embodiments, if the property enters into foreclosure, the entity operating or associated with the property investment and liquidity system 108 may foreclose the property and become the owner of the property. The entity may then work with the investor with the largest investment position to either transfer ownership of the property or come to another resolution. The investor with the largest investment position may be incentivized to purchase the investment positions of the other investors so that they can own the property free and clear of other encumbrances.

In this way, it may be appreciated that the entity can contractually control the negotiation and ultimate resolution of a default through agreements with the property owner and investors.

Investors who do not have the largest investment within a property may still, in some cases, receive a return if the property is forfeit. For example, the investor that receives the property may provide some satisfaction of past investments with other investors based on the value of the property, insurance, and/or the like.

In step 622, the second investor 208 makes a purchase of the third investor's investment. Certificates of the investment, documents documenting the investment, tracking of their investment may be performed by the property investment and liquidity system 204 which may provide a complete picture of the loans, loan performance, investor positions, financials, and/or the like. Money from the second investor 2084 the investment of the third investor 210 may be provided to the property investment and liquidity system 204 which may then relay those funds to the third investor 210. The investment module 312 may update rules and tracking to ensure that updated daily returns in steps 624 and 626 are provided to the first investor 206 and the second investor 208, respectively.

Figure 7:
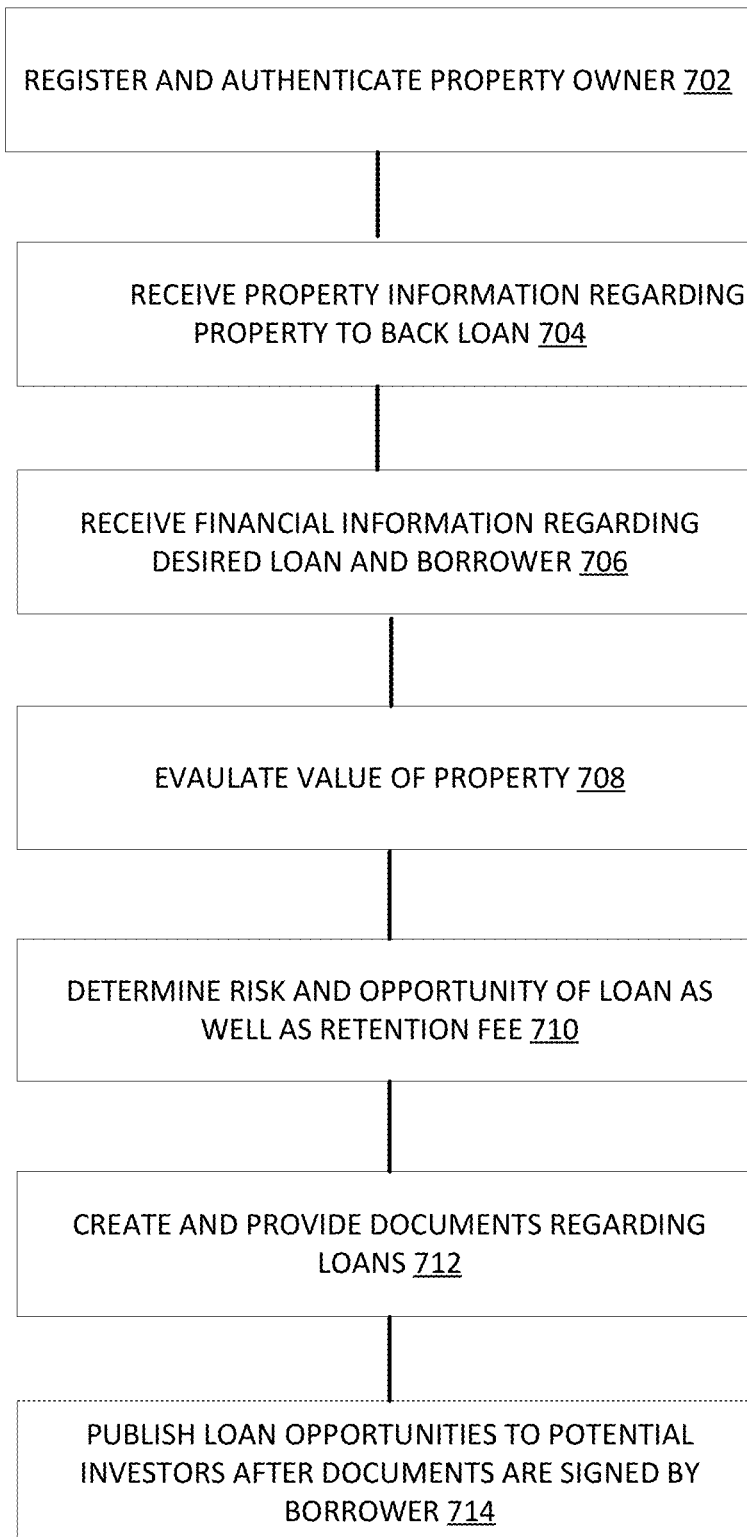
FIG. 7 is a method for a property owner to create a loan opportunity.

FIG. 7 is a method for a property owner to create a loan opportunity. In step 702, the property investment and liquidity system 108 receives a registration request from the property owner. The property investment and liquidity system 108 may authenticate the identity of the property owner by receiving personal information, financial information (e.g., banking information), and confirming/authenticating the information against public, private, or government databases (e.g., with one or more financial institutions where the property owner banks).

In step 704, the property owner may provide the property investment and liquidity system 108 information regarding the property that will be collateral for the loan (e.g., address, features, value of the home, proof of ownership), amount the property owner seeks as a loan, and duration of the loan.

In step 706, the property owner may provide the property investment and liquidity system 108 information regarding the loan (e.g., financial information) that they desire including, for example, desired amount, desired rate, duration, and the like.

In step 708, the property investment and liquidity system 108 may evaluate value of the property based on the property information, purchase price, any debts or encumbrances against the property, ownership interest (e.g., amount of ownership), other claims (e.g., judgments, life estates, or the like), purchase history, the economy, prices of similar homes, the market for homes, and/or the like. Such information may be collected from any number of databases (e.g., newspapers, assessor's offices, real estate websites, title offices, and/or the like).

In step 710, the property investment and liquidity system 108 may determine risk and opportunity of loan as well as retention payment. For example, the property investment and liquidity system 108 may determine a loan amount that meets the borrower's needs and covers a retention payment (e.g., a fee for the service and/or a first month's interest payments to investors). The retention payment may include an upfront payment to cover a range of thirty to thirty five days of daily payments.

In step 712, the property investment and liquidity system 108 may retrieve one or more loan agreement templates from the documents module 322 and populate fields with property information, financial information, borrower information, and/or other terms and conditions. The property investment and liquidity system 108 may provide the agreements to the property owner for their review, negotiation, and/or signing.

In step 714, after the signed documents are received (e.g., the signed documents may be digitally signed), the property investment and liquidity system 108 may publish the loan opportunity with other loan opportunities to potential investors.

Figure 8:
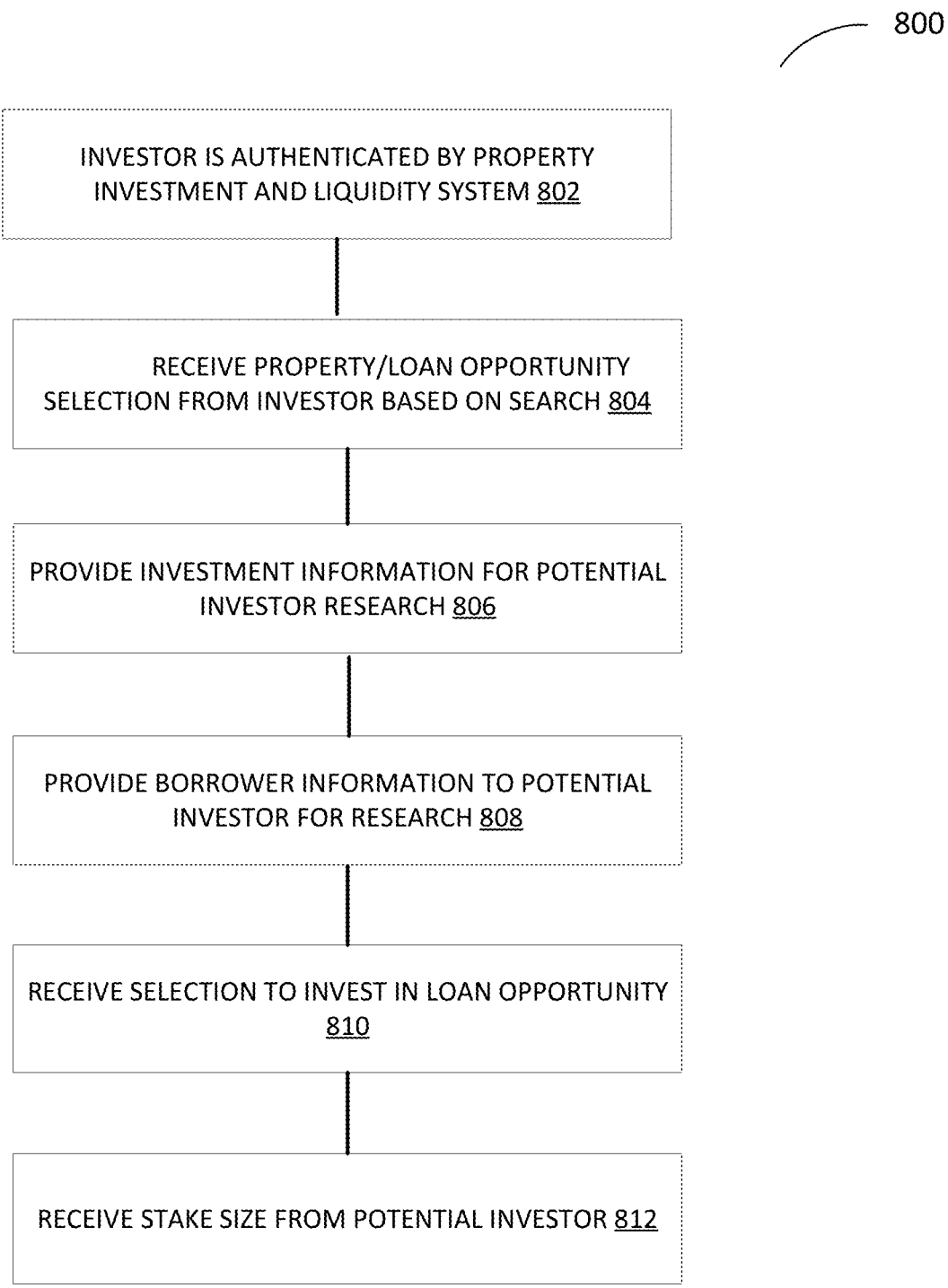
FIG. 8 depicts a method for an investor to find, investigate, and commit to one or more loan opportunities in some embodiments.

FIG. 8 depicts a method for an investor to find, investigate, and commit to one or more loan opportunities in some embodiments. In step 802, the investor may log into an account on the property investment and liquidity system 108 and search for loan opportunities. It may be appreciated that the investor may search for loan opportunities based on address, amount of investment available for the opportunity, rate, and/or the like. In one example, the investor may utilize a dynamic graphical user interface such as that depicted in FIG. 10 to research opportunities.

Figure 10:
FIG. 10 is a dynamic graphical user interface (GUI) for an investor on an investor's digital device.

FIG. 10 is a dynamic graphical user interface (GUI) 1000 for an investor on an investor's digital device. The GUI 1000 may be depicted in an application on an investor's digital device (e.g., such as a smartphone). All or some of the information depicted in the GUI 1000 may be provided by the property investment and liquidity system 108.

Based on a query, an investor may view one or more properties and/or loan opportunities in a single interface when multiple interfaces. The information that populates interface may be provided by the publication module 308 of the property investment and liquidity system 108

In the example of FIG. 10, the investor may view multiple properties including, for example, opportunity 1002 and opportunity 1004. In opportunity 1002, the graphical user interface indicates the address of the property that is collateral for the loan, and amount of loan requested as well as an amount of loan still available for investment, the yield, duration, LTV, and style of house. Similarly, in opportunity 1004, the graphical user interface provides similar information for different property and different loan opportunity.

It may be appreciated that an investor may review any number of opportunities and properties using any combination of criteria. In some embodiments, the investor may identify preferred properties by indicating or flagging them as favorites or preferred opportunities so that they can be reviewed later.

In step 804, the investor may select a property from the interface to do further research on the investment opportunity. Further research on the investment opportunity may include, but is not limited to, an investment calculator, capital stack, historical value, and equity cushion.

In one example, the investor may utilize a dynamic graphical user interface such as that depicted in FIG. 11 to research properties and particular loan opportunities.

FIG. 11 is an investor dynamic graphical user interface (GUI) 1100 for an investor on an investor's digital device. All or some of the information depicted in the GUI 1100 may be provided by the property investment and liquidity system 108. The investor dynamic GUI 1100 may include three tabs including, for example, an investment tab, a property (e.g., home) tab, and a borrower tab.

The investment calculator depicted in GUI 1100 may enable an investor to select different investment amounts and calculated total return, a monthly return, annual interest rate. The investment calculator may further include a duration of the loan, an optional loan purpose (e.g., to fix or flip the property), and the like.

In various embodiments, an investor may slide and indicator along a predefined graphical object such as a line to input different amounts of potential investment. In GUI 1100, an investor may utilize the slide to indicate a potential investment of $1200. As the slide position along the graphical object changes, the potential amount investment may change, and calculations may change in the GUI 1100. For investment of $1200, the investment calculator may show a $257.28 total return and $21.44 monthly return.

The capital stack portion of the GUI 1100 indicates an amount of equity in the property and an amount of debt in the property. In some embodiments, the GUI 1100 indicates an amount of debt in the property assuming the current loan is fully invested (e.g., one or more investors fund the full amount of the proposed loan). The capital stack may indicate the amount of equity in the property, the proposed loan in the property assuming it is fully invested, and or any other loans on the property.

The historical value portion of the GUI 1100 indicates a current property value as well as a historical value of the property. In some embodiments, the loan facilitation module 314 calculates an estimated value of the property in the future based on property trends, similar properties in the area, and/or the like.

The equity cushion portion of the GUI 1100 indicates an amount of equity in the property and may, optionally, provide a simulation or simulation results of a potential recession. In the example, GUI 1100 displays results of the 2008 recession to indicate what the equity cushion may look like over time. The graph is provided in GUI 1100 to indicate an amount of equity cushion over time or lack thereof. There also may be an indication of the last recession, in this example the recession of 2008, and indicate values of similar properties in similar areas during that time.

In step 806, the investor may opt do further research on the property related to the investment opportunity. Further research on the property related to the investment opportunity may include, but is not limited to, property statistics, links to documents related to the property, a map, graphs of appreciation in value of similar properties, and/or job prospects in the area.

In one example, the investor may utilize a dynamic graphical user interface such as that depicted in FIG. 12 to research properties.

FIG. 12 is an investor dynamic graphical user interface (GUI) 1200 for an investor to research a property on an investor's digital device. All or some of the information depicted in the GUI 1200 may be provided by the property investment and liquidity system 108. The investor dynamic GUI 1200 may be a property tab.

The property statistics portion of the GUI 1200 depicts a value of the property, a price per square foot of the property, lot size, school total square foot of the property, and attributes of the property (e.g., number of beds and number of bathrooms). It may be appreciated that any amount of information regarding attributes of the property, its value, aspects of the property that contribute to the value, and/or the like may be depicted.

The documents portion of the GUI 1200 may include links to various documents including appraisals, project overview, the statement of work for past work, property profiles, representations of the property owner, details of title search, documents related to other debts related to the property, and/or the like. In some embodiments, investor may tap or interact with the document link to retrieve the document from the property investment and liquidity system 108. The investor's digital device may depict the document to enable the investor to review and read the document. Once the document has been reviewed to the investor satisfaction, the investor may close the document, and, in some embodiments, return to the GUI 1200.

The map may show a location of the property and the surrounding areas. In the example of GUI 1200, a map of San Francisco and ZIP Code is included. In some embodiments, the mat may be linked to other maps in applications or on websites. An investor may interact with the map in GUI 1200 to navigate to a map and an application or website for further view.

The portion of graphs of appreciation in value of similar properties of the GUI 1200 may indicate an average value index for the US, average value index for region, and/or the like. In GUI 1200, an example of average housing appreciation is shown in the US generally and in the region of the location of the property in question. This portion further may show, for similar properties in the US and or the region, a median age of the property, and median price of the property, appreciation over predefined durations (e.g., 12 months, five years, 10 years), property tax rate, homes owned, vacancy rate, homes rented, and/or the like.

The jobs portion of the GUI 1200 may indicate jobs and income levels for the region where the property is located, a city where the property is located, county where the property is located, the state where the property is located, and/or the United States. A graph may be depicted indicating a change in jobs and salaries over time for different geographical areas. In some embodiments, the jobs portion includes income per capita, a household income, unemployment, and job growth to enable the investor to consider other aspects that may influence the value of the property.

In step 808, the investor may opt to do further research regarding the borrower of the investment opportunity. The borrower may provide all or part of their information. In one example, the investor may review the borrower's income, income type, assets, credit score, education, existing debt, related documents of the financial health of the borrower and or the like.

Figure 13:
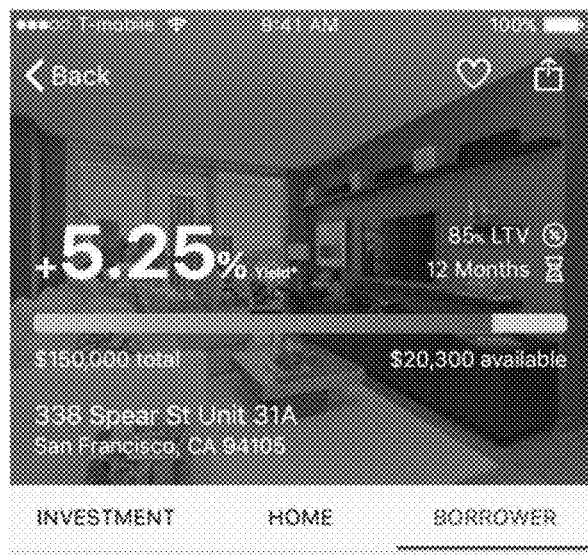
FIG. 13 is an investor dynamic graphical user interface (GUI) for an investor to research a potential borrower on an investor's digital device.

FIG. 13 is an investor dynamic graphical user interface (GUI) 1300 for an investor to research a potential borrower on an investor's digital device. All or some of the information depicted in the GUI 1300 may be provided by the property investment and liquidity system 108. The investor dynamic GUI 1300 may be a borrower tab. The GUI 1300 may include a borrower portion and a documents portion.

The borrower portion of the GUI 1300 may depict various information about the borrower and the borrower's financial health. An example of GUI 1300, information presented includes age, income, income type, assets, credit scores, and debt. In some embodiments education and marital status may also be shown. It will be appreciated that similar, more, or less information may be provided to the potential investor. In various embodiments, the borrower may choose how much information of themselves they wish to share with potential investors.

The documents portion of the GUI 1300 may include links to credit reports, pay stubs, bank statements, and/or the like. There may be any number of links to any number of documents that may assist the potential investor in reviewing the risks and rewards of the opportunities.

In step 810, the investor may choose to invest in a loan opportunity. In one example, at the bottom of the GUI 1100, GUI 1200, and GUI 1300, there may be an interactive button or link to enable an investor to pursue a loan opportunity (e.g., a graphical object with the word invest displayed).

In some embodiments, once the investor chooses to potentially invest in a loan opportunity, the graphical user interface may depict investor information requesting whether the investor is an accredited investor. In some embodiments, the question to the investor as to whether they are an accredited investor is a requirement. In one example, an interface may be presented asking whether the investor falls under different categories of being an accredited investor according to the Security and Exchange Commission (SEC). In one example, the investor may select a category indicating that the investor earns "more than $200,000 per year" or "earns more than $300,000 per year with a spouse." The investor may also be required to select a category indicating that their income has "been consistent for the past two years and I can reasonably expect the same level of income going forward." Alternately, the investor may select a different category indicating that they have "a net worth exceeding $1 million either individually or jointly, excluding the value of [the investor's] primary residence."

Figures 14, 15:
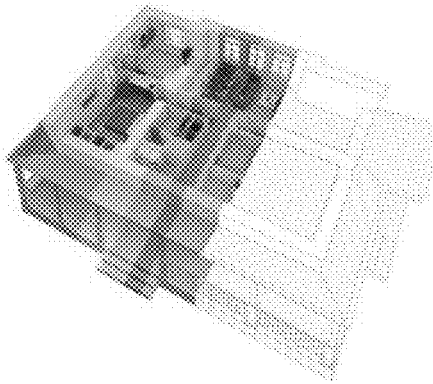
FIG. 14 is an investor dynamic graphical interface (GUI) requesting information regarding whether the investor is an accredited investor.
FIG. 15 is an investor dynamic graphical interface (GUI) that may be depicted in the application of the investor that enables the investor to determine an amount of investment in the loan opportunity

FIG. 14 is an investor dynamic graphical interface (GUI) 1400 requesting information regarding whether the investor is an accredited investor.

The investor's representations as to whether they are an accredited investor may be saved and stored by the property investment and liquidity system 108 as the property investment and liquidity system 108 creates records for the potential investment. These records may be audited or reviewed by the SEC or other parties with legal rights to access that information.

If the investor is not an accredited investor and/or indicates that they are not an accredited investor, the property investment and liquidity system 108 may indicate that the investor is not allowed to make investments using the system.

If the investor represents that they are an accredited investor, the process may continue to step 812. In step 812, investor may choose their stake size to invest in the loan opportunity.

FIG. 15 is an investor dynamic graphical interface (GUI) 1500 that may be depicted in the application of the investor that enables the investor to determine an amount of investment in the loan opportunity. There may be a slider that may be moved along a graphical object to enables the investor to change an amount to invest. Alternatively, there may be a field to enter an investment amount.

In some embodiments, the GUI 1500 may include an interactive graphic that indicates how much of the loan opportunity is invested or uninvested. For example, a property graphic may be depicted that fills with color or has another indication. Any unfilled portion of the property graphic may indicate a relative amount of the loan opportunity that remains uninvested.

The GUI 1500 may also include similar calculations based on a selected amount of investment including, for example, an approximate total return, approximate monthly return, and approximate daily return. The GUI 1500 may have other information regarding the loan opportunity including, for example, annual interest rate (e.g., APR), and duration.

Figure 9:
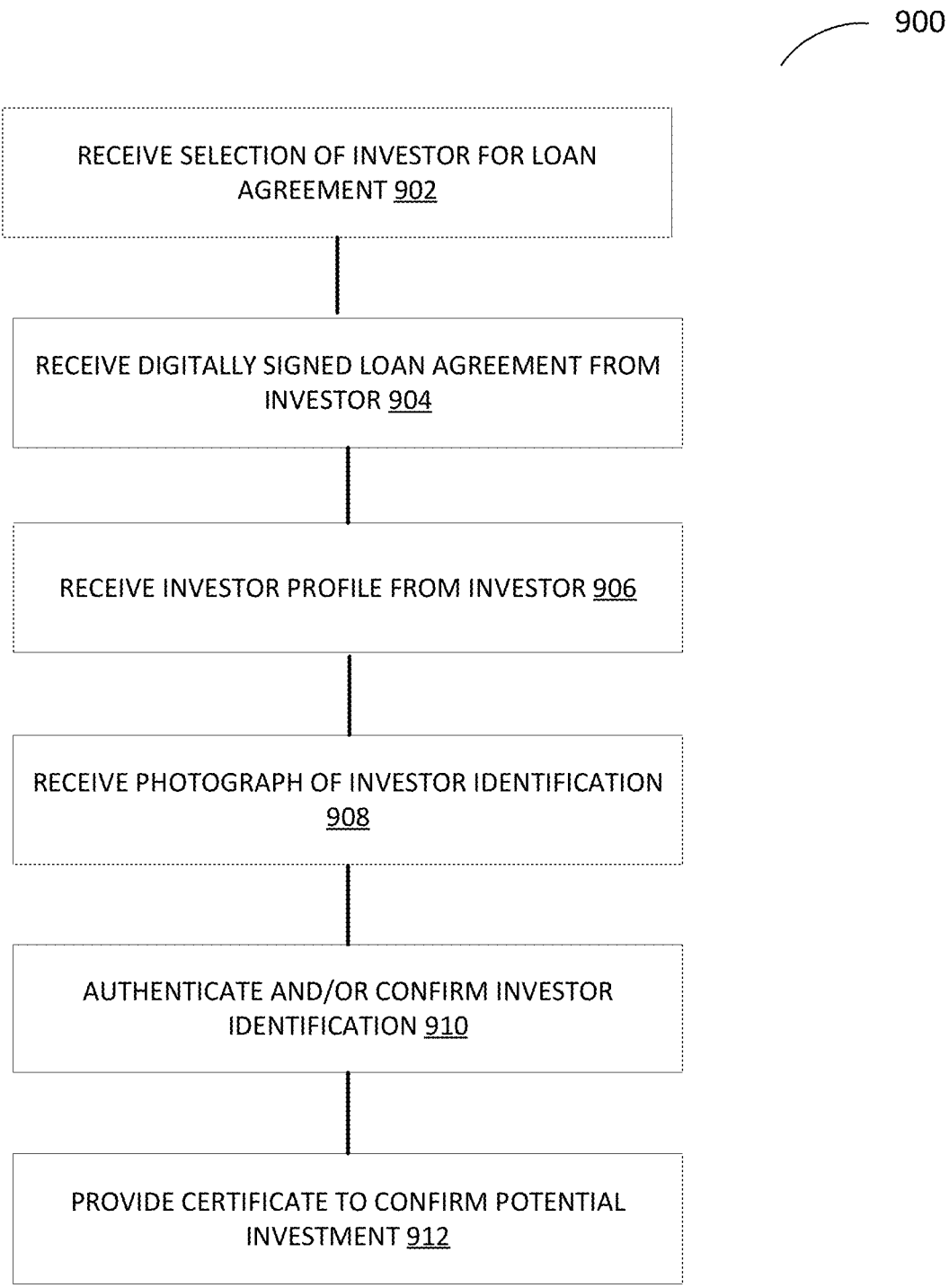
FIG. 9 is a flow chart for a method for investing in some embodiments.

FIG. 9 is a flow chart for a method for investing in some embodiments. After an investor determines to make an investment, the property investment and liquidity system 108 may create one or more legal documents to create or support the financial instrument. In various embodiments, the property investment and liquidity system 108 may have a variety of document templates that may be modified based on the loan information, property information, amount of investment, and the like. The property investment and liquidity system 108 may create the documents and populate the necessary information for review and signature by the investor.

Optionally, the property investment and liquidity system 108 may present to the investor in opportunity to add principal protection insurance. In one example, principal protection insurance may enable an investor to ensure against the possibility of the loan defaults (e.g., that they will receive their full principal back as well as an opportunity to sell their investment back to the property investment and liquidity system 108 at any time). The investor may provide a principal protection fee in exchange for the service. In one example, the principal protection fee may be 1% of the total loan amount or the investor's portion of their particular investment.

In some embodiments, a GUI is presented through the investor's smartphone to request whether they would like principal protection insurance. The GUI may depict a total investment selected by the investor, an annual interest rate, a daily return, an approximate total return, an approximate monthly return, duration of the investment, as well as other information regarding the value of principal protection insurance.

Once an investor chooses to invest in a loan opportunity, the property investment and liquidity system 108 may calculate interest at a particular time daily (e.g., midnight Pacific Standard Time daily). A daily interest may be provided to the investor (assuming the full loan has been invested) following a 24 hour period. For example, if the investor made an investment at 3 PM on Tuesday, they may start receiving interest at 12 AM on Thursday. Interest may be calculated based on the investment amount of the investor at midnight medically amount still in the processing period.

In step 902, the investor may make a selection to receive a loan investment agreement. The loan investment agreement may be created by the property investment and liquidity system 108 from a template and populating relevant information regarding the loan opportunity and investment information related to the investor's chosen investment.

The loan investment agreement may indicate the address, borrower, investor, amount to be invested, rate, duration of loan, address of property, agreement regarding retention payment (discussed herein), and/or the like. In some embodiments, the loan investment agreement may include a representation of the investor that they are an accredited investor.

In step 904, the investor may choose to sign the loan investment agreement. In various embodiments, the application on the investor's digital device requires the investor to review the entire document and/or may wait a period of time to encourage the investor to carefully review the document. In some embodiments, the application on the investor's digital device may not allow the investor to sign the document until the entire document has been viewed and/or a period of time has passed for the investor to review.

The application on the investor's digital device may enable the investor to sign the document directly through the interface (e.g., using their finger). In some embodiments, the application on the investor's digital device utilizes digital signatures such as Docusign and/or credentials (e.g., encryption keys and the like) that may be authorized by the property investment and liquidity system 108 and/or a trusted third-party.

Figure 16:
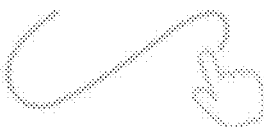
FIG. 16 depicts an example final confirmation of a loan investment agreement in some embodiments.

FIG. 16 depicts an example final confirmation of a loan investment agreement in some embodiments. After the investor has reviewed the loan investment agreement, the GUI 1600 may depict a final confirmation, including a total amount of investment, a confirmation that they investor wishes to invest the amount of the investment, the APR, and the duration of the investment.

In some embodiments, the investor can sell the investment before the full duration of the investment (e.g., at any time or at one or more specific times).

It will be appreciated that the investment may be active once the loan is funded. After the loan is funded, the investor may start to receive a return (e.g., interest) at midnight after a full 24 hour ownership period.

In step 906, the investor may be requested to complete an investor profile. It may be appreciated that the investor may be requested to complete the investor profile at any time including, for example, before looking for investment opportunities, before committing to an investment, after committing to an investment, and/or the like.

In some embodiments, the investor profile may require the investor to indicate a country they are investing from, income over one or more years (e.g., 2017 income, 2018 income, expected 2019 income, and the like), and net worth. The investor profile may require the investor to provide their residence address as well as state of residence, and contact information.

In step 908, the property investment and liquidity system 108 or application on the investor's digital device may require the investor to provide a photograph of their passport, driver's license, or other identification information. In some embodiments, the property investment and liquidity system 108 may utilize government and/or financial databases to confirm identification information. For example, if an investor provides passport information including for example, a picture of their passport information, the property investment and liquidity system 108 may confirm or authenticate the name in the passport, date of birth, place of birth, date of issue, date of expiration, picture, and/or the like.

In step 910, the property investment and liquidity system 108 may authenticate the identification information by confirming the information provided by the investor against information from government, private, and public databases (e.g., terrorist and criminal databases). If one or more elements of the investor's identification information fail to be confirmed as authentic, the property investment and liquidity system 108 may require additional information or deny the investor the investment opportunity.

In step 912, the property investment and liquidity system 108 may optionally provide the investor a graphic of a certificate and/or a digitally signed certificate regarding their investment.

In various embodiments, the property investment and liquidity system 108 may store information from the investor including photographs of identification information, personal information provided by the investor, and signed documents in order to create a record of the loan opportunity and the investor's investment. This information may be required in audits and in tracking the investors' investments.

Figure 17:
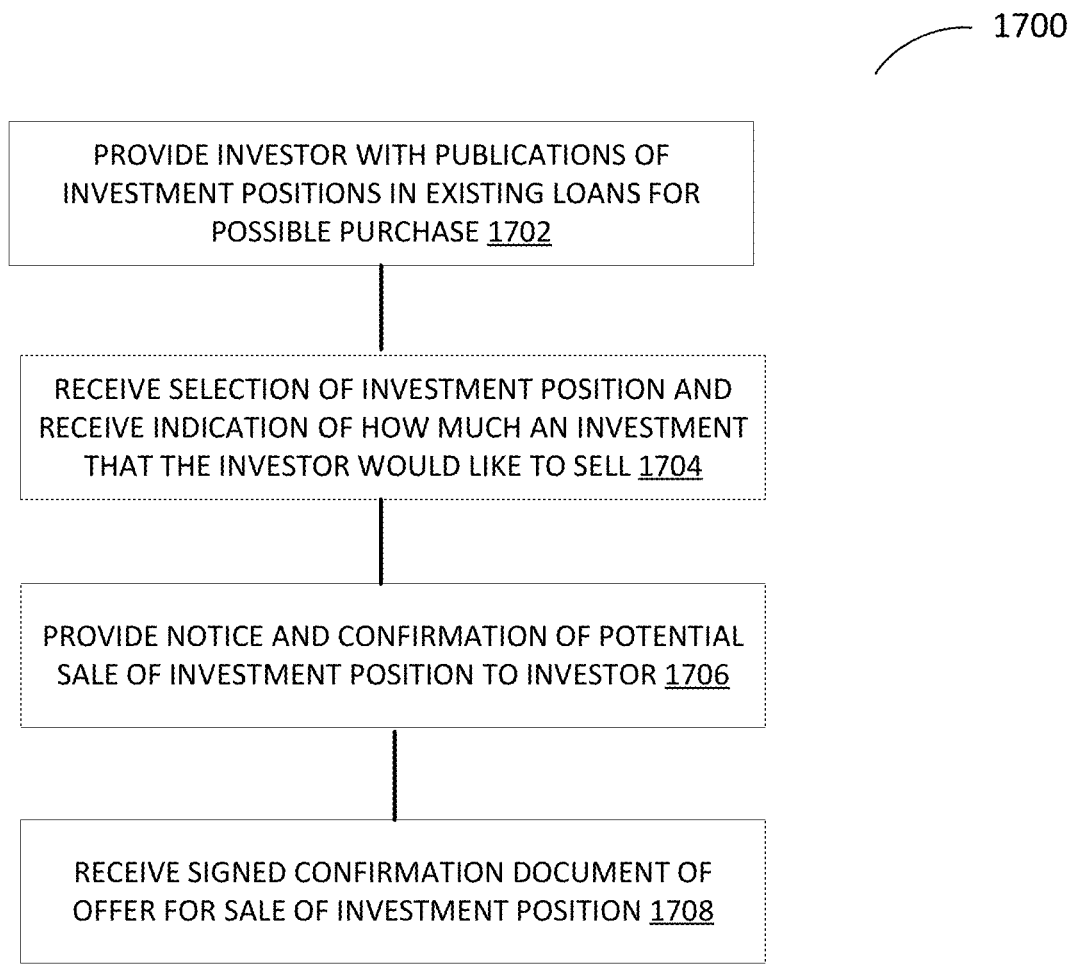
FIG. 17 is a flowchart for an investor to sell their investment to another investor in some embodiments.

FIG. 17 is a flowchart for an investor to sell their investment to another investor in some embodiments. In step 1702, the investor may utilize their application on their digital device to view their currently invested investment opportunities. The application on their digital device may include a graphical user interface indicating their investments, total return, monthly return, and/or the like.

Figure 18:
FIG. 18 is a dynamic graphical user interface (GUI) for an investor that enables the investor to buy the investments of the particular loan opportunity of other investors or sell all or part of their investments of the particular loan opportunity.

FIG. 18 is a dynamic graphical user interface (GUI) 1800 for an investor that enables the investor to buy the investments of the particular loan opportunity of other investors or sell all or part of their investments of the particular loan opportunity. The GUI 1800 provides an opportunity for the investor to seek to invest more in the particular loan opportunity (e.g., by seeking to buy all or part of loan investments for the particular loan opportunity from other investors) or to seek sell all or part of their investment to other investors.

In step 1704, the investor may indicate how much of their investment they would like to sell to another investor.

Figure 19:
FIG. 19 is a dynamic graphical user interface (GUI) for an investor that enables the investor to sell all or part of their investments.

FIG. 19 is a dynamic graphical user interface (GUI) 1900 for an investor that enables the investor to sell all or part of their investments. The GUI 1900 may indicate the investor's total investment in the loan opportunity, and enable selection of an amount of the investment opportunity they wish to sell. In one example, there may be a slider that can be moved along a graphical object that enables the investor to choose the amount of their investment they wish to sell. Alternately or additionally, there may be an opportunity for the investor to manually input a number indicating the amount of the investment they wish to sell. The GUI 1900 may dynamically calculate how much of the investment remains (if any), total return, and monthly return.

In step 1706, the investor may have the opportunity to review the results of their selling decisions. The property investment and liquidity system 108 may create a final confirmation document for the investor's review to enable the investor to be informed of their decision. The final confirmation document may be a template populated by information from the investor (e.g., from information provided to the GUI 1800).

Figure 20:
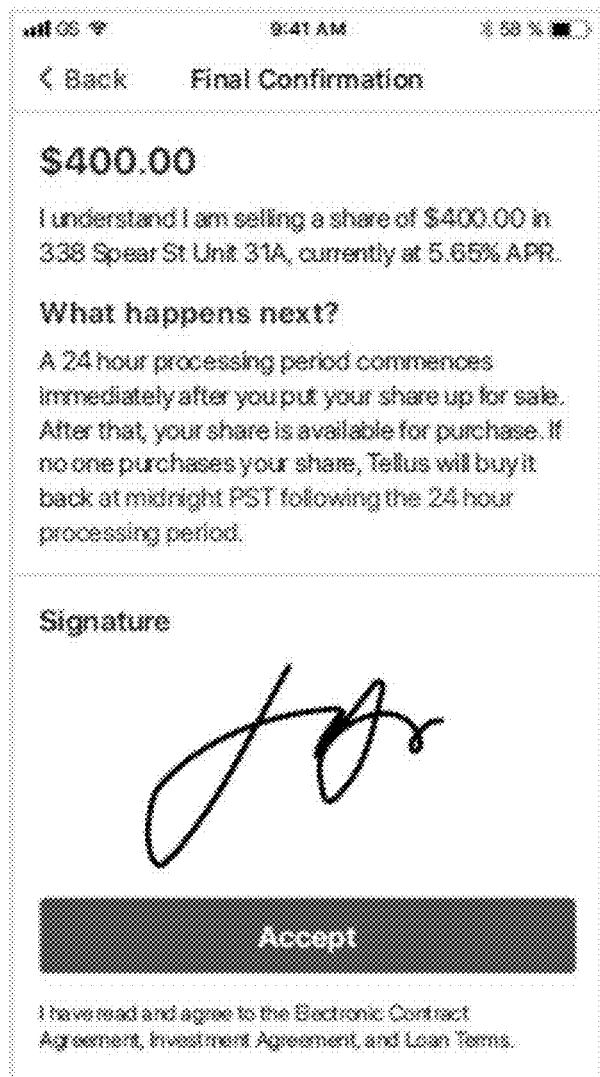
FIG. 20 is a dynamic graphical user interface (GUI) to confirm the investor's intention to sell their investment.

FIG. 20 is a dynamic graphical user interface (GUI) 2000 to confirm the investor's intention to sell their investment. In GUI 2000, an amount of the investment to be sold is depicted as well as the address of the property and the rate. During 2000 further allows the investor to sign the document using a finger or other digital means.

Although various figures depict digital signing of documents, will be appreciated that it one or more documents may be printed, physically signed, and provided back to the property investment and liquidity system 108.

In step 1708, the investor may sign the confirmation document. After a predetermined processing period, the amount of investment that the investor wishes to sell may be put up for sale to other investors.

The property investment and liquidity system 108 may provide an interface that enables investors to search for investments in existing, funded loan opportunities for additional investment and greater returns. The property investment and liquidity system 108 may provide query fields to enable different investors to search for existing, funded loan opportunities using loan information, addresses, names of investors, names of borrowers, and/or the like.

Figure 21:
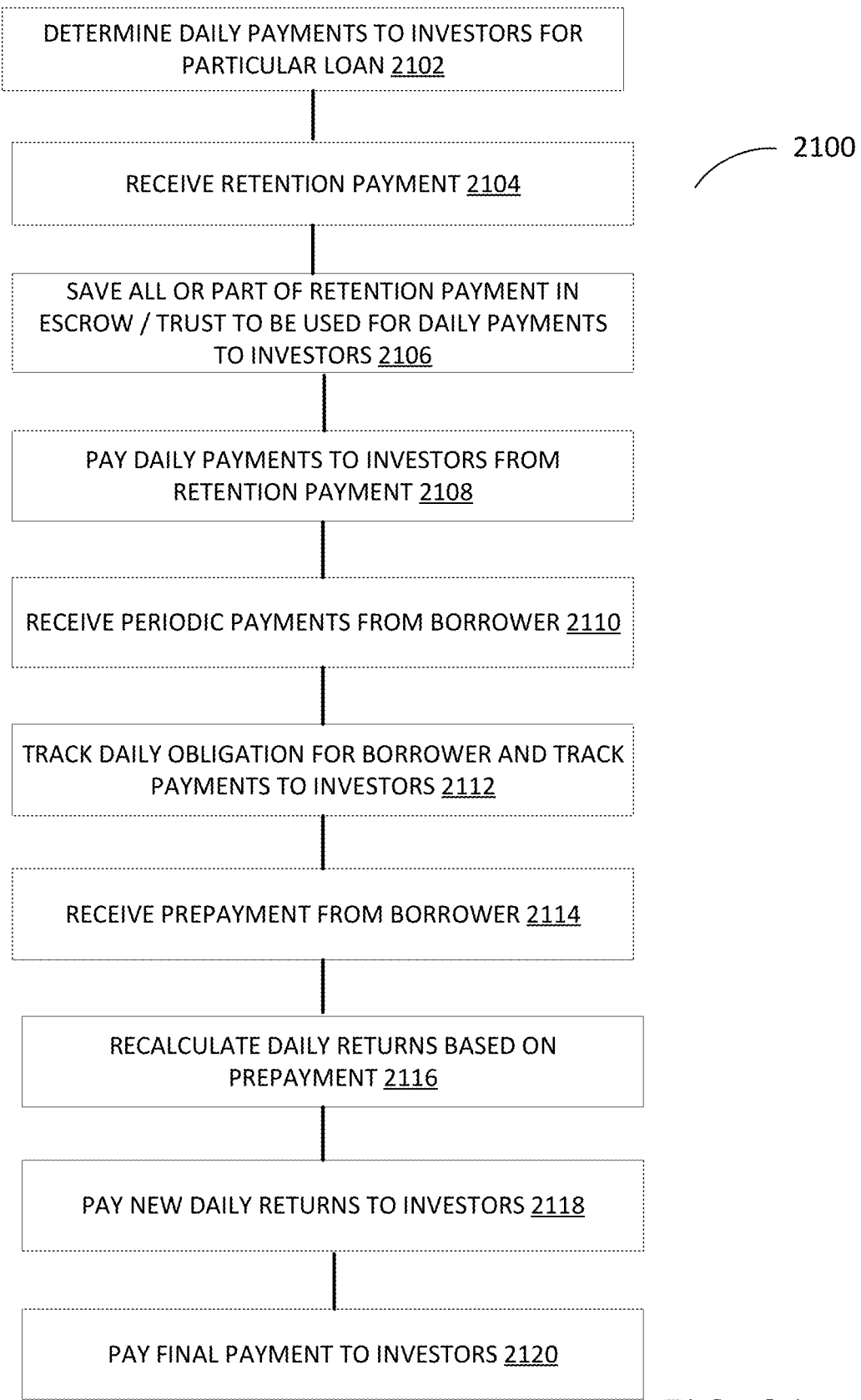
FIG. 21 is a method for determining daily payments in some embodiments.

FIG. 21 is a method for determining daily payments in some embodiments. In various embodiments, the property investment and liquidity system 108 will calculate the daily payments once: (1) a loan opportunity is fully funded by any number of investors, (2) when an investor sells all or part of the investment, and (3) when the borrower (e.g., property owner) prepays a portion of their loan early.

In step 2102, the property investment and liquidity system 108 determines daily payments. In various embodiments, the property investment and liquidity system 108 creates a loan payment and amortization schedule (calculated daily) for the investors. The borrower may pay their loan every thirty days and because each day's payments are generally the same as the previous days, the borrower sees smooth payments every thirty days while the investors receive a smooth stream of daily payments. The daily payment calculation may be made at the time the loan opportunity is funded and/or at any time.

In step 2104, the property investment and liquidity system 108 receives a retention payment from the funds transferred from the investors. In step 2106, all or part of the retention payment may be placed in trust or escrow. The retention payment that is placed in trust or escrow may be used to pay the daily returns to the investors, at least until the first loan payment is received from the borrower.

In step 2106, the property investment and liquidity system 108 provides the remaining funds from the investors to the borrower (e.g., property owner).

In step 2108, the property investment and liquidity system 108 may pay daily return payments to the investors from the retention payment that was placed in trust or escrow. As a result, the investors receive daily interest payments a month (or so) before the borrower provides their first payment. As the amount in trust or escrow is drawn down, then a new payment is received from the borrower.

In step 2110, the property investment and liquidity system 108 receives a monthly payment from the borrower. In step 2112, the property investment and liquidity system 108 places the monthly payment in trust or escrow.

In step 2114, the property investment and liquidity system 108 makes daily return payments to the investors and the amount in trust or escrow is drawn down until the next payment.

In some embodiments, principal payments may be split and paid out to the nearest penny rounded down to the investors based on the amount of their investment. In various embodiments, payments are split amongst the investors based on the percent of their investment and paid to the nearest penny rounded down. In various embodiments, any fractional amounts left are then allocated to the respective share owners. Once an investor builds up fractional amounts to a whole penny, then the penny may be paid out.

In various embodiments, interest payments may be split and paid out to the nearest penny rounded down to the investors based on the amount of their investment. In various embodiments, any fractional amounts left are then allocated to the respective share owners. Once an investor builds up fractional amounts to a whole penny, then the penny may be paid out. In some embodiments, fractional amounts of interest left are collected by the owner or operator of the property investment and liquidity system 108 as a part of the payment for the services.

In step 2112, the property investment and liquidity system 108 tracks the daily obligation for the borrower and tracks payments to investors.

In step 2114, the property investment and liquidity system 108 receives a prepayment from the borrower. The prepayment is more than what is immediately due for the loan obligations. The property investment and liquidity system 108 may divide all or part of the prepayment to the investors, based on the percentage of investment.

In step 2116, the property investment and liquidity system 108 may recalculate daily returns for the investors after the prepayment is received from the borrower. Once the prepayment is divided amongst the inventors, the daily returns and/or monthly amounts due from the borrower may change. The loan duration and rate may be maintained and, as a result, the amount of the monthly payment from the borrower and daily return may decrease.

In one example, if the current loan balance is $1000 and has $10 of principal accrued with $8 of interest accrued, and the borrower pays an unscheduled payment of $20, the $20 will be used to settle the $10 and $8 accrued with the remaining two dollars used to pay down the loan balance. The resulting loan balance at the end of the day will be, in this example, $998.

In step 2118, the property investment and liquidity system 108 pays out the new daily returns to the investors.

In step 2120, the property investment and liquidity system 108 pays the final payment to the investors. In some embodiments, a final payment on the loan may be split like regular principal. Further, the owner or operator of the property investment and liquidity system 108 may ensure that all pennies are paid out/made whole so that the original principal lent equals the total principal paid back.

While FIGS. 10 through 18 depict various example graphical user interfaces, it may be appreciated that any graphical user interface may provide information to the investor and enable the investor to make research investment choices. Another graphical user interface may be utilized which may include similar, different, or rearranged information. Similarly, the layout of the information may be different in different GUIs, and functionality (e.g., tabs, buttons, sliders, input fields and/or the like) may be different in different GUIs.

Further, information provided to investors, as depicted in FIGS. 10 through 18, may be calculated and provided by the property investment and liquidity system 108, on an investor smartphone (e.g., through an application on the investor's digital device), or a combination of both.

Figure 24:
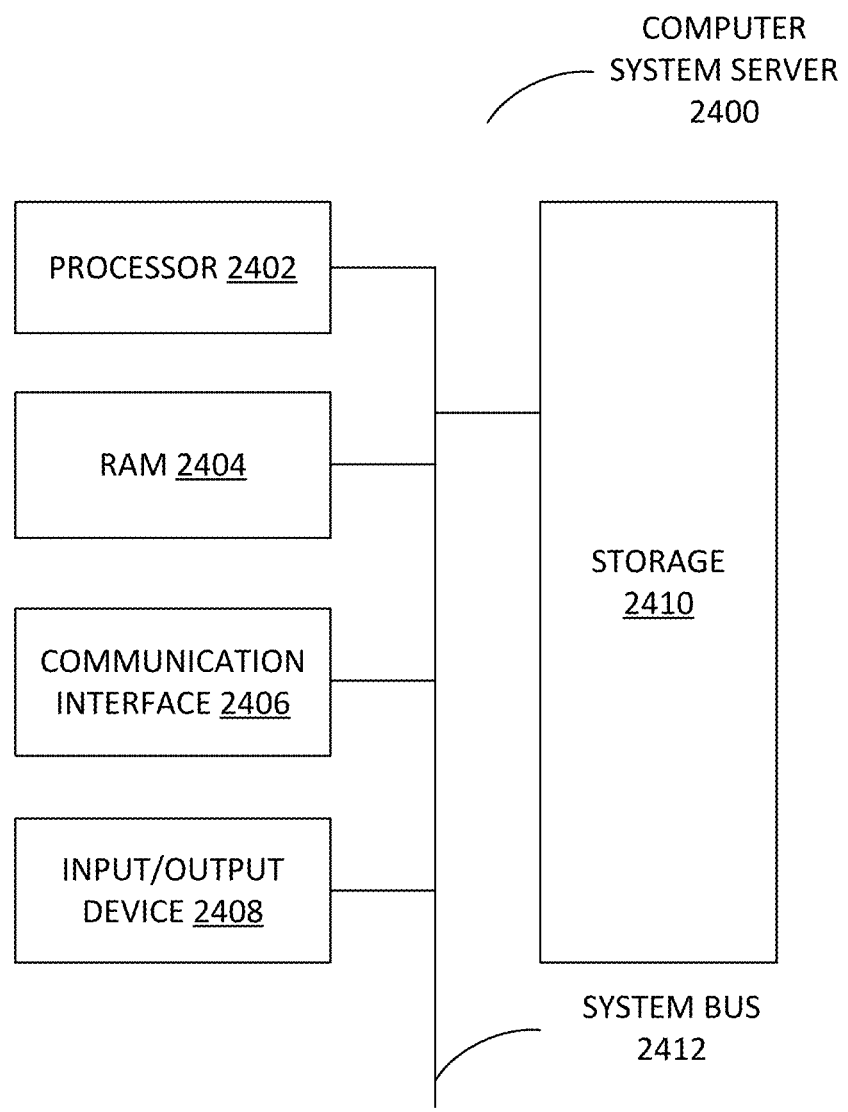
FIG. 24 depicts a block diagram of an example digital device according to some embodiments.

FIG. 24 depicts a block diagram of an example digital device 2400 according to some embodiments. Digital device 2400 is shown in the form of a general-purpose computing device. Digital device 2400 includes processor 2402, RAM 2404, communication interface 2406, input/output device 2408, storage 2410, and a system bus 2412 that couples various system components including storage 2410 to processor 2402.

System bus 2412 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Digital device 2400 typically includes a variety of computer system readable media. Such media may be any available media that is accessible by the digital device 2400 and it includes both volatile and nonvolatile media, removable and non-removable media.

In some embodiments, processor 2402 is configured to execute executable instructions (e.g., programs). In some embodiments, the processor 2402 comprises circuitry or any processor capable of processing the executable instructions.

In some embodiments, RAM 2404 stores data. In various embodiments, working data is stored within RAM 2404. The data within RAM 2404 may be cleared or ultimately transferred to storage 2410.

In some embodiments, communication interface 2406 is coupled to a network via communication interface 2406. Such communication can occur via Input/Output (I/O) device 2408. Still yet, the digital device 2400 may communicate with one or more networks such as a local area network (LAN), a general wide area network (WAN), and/or a public network (e.g., the Internet).

In some embodiments, input/output device 2408 is any device that inputs data (e.g., mouse, keyboard, stylus) or outputs data (e.g., speaker, display, virtual reality headset).

In some embodiments, storage 2410 can include computer system readable media in the form of volatile memory, such as read-only memory (ROM) and/or cache memory. Storage 2410 may further include other removable/non-removable, volatile/non-volatile computer system storage media. By way of example only, storage 2410 can be provided for reading from and writing to a non-removable, non-volatile magnetic media (not shown and typically called a "hard drive"). Although not shown, the digital device 2400 may include a magnetic disk drive for reading from and writing to a removable, non-volatile magnetic disk (e.g., a "floppy disk"), and/or an optical disk drive for reading from or writing to a removable, non-volatile optical disk such as a CDROM, DVD-ROM or other optical media. In such instances, each can be connected to system bus 2412 by one or more data media interfaces. As will be further depicted and described below, storage 2410 may include at least one program product having a set (e.g., at least one) of program modules that are configured to carry out the functions of embodiments. In some embodiments, RAM 2404 is found within storage 2410.

Program/utility, having a set (at least one) of program modules may be stored in storage 2410 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein. A module may be hardware (e.g., ASIC, circuitry, and/or the like), software, or a combination of both.

It should be understood that although not shown, other hardware and/or software components could be used in conjunction with the digital device 2400. Examples include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband/or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects discussed herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of some of the embodiments are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, creating means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of some of the embodiments are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It may be apparent to those skilled in the art that various modifications may be made and other embodiments may be used without departing from the broader scope of the discussion herein. Therefore, these and other variations upon the example embodiments are intended to be covered by the disclosure herein.

The invention claimed is:

1. A non-transitory computer readable medium comprising instructions executable by a processor, the instructions being executable to perform a method, the method comprising:

navigating, using a first investor system, to a first investment interface on a network provided by an investment system, the first investment interface being provided to an investor's digital device, the investment system publishing on the first investment interface a first particular loan opportunity among a plurality of different loan opportunities, the first particular loan opportunity being based on first loan terms and first property information, the plurality of different loan opportunities being searchable through an interface provided by the investment system, the first property information identifying a first property to secure a first loan of the first particular loan opportunity, the first particular loan opportunity being an opportunity to invest in the first loan and no other loans, the first loan terms being agreed upon by a first property owner seeking the first loan, the investment system having assessed a first value of the first property based, at least in part, on the first property information of the first property;

providing, from the first investor system, a first query to seek loan opportunities;

receiving different loan opportunities of the plurality of different loan opportunities based on the first query;

providing a selection of the first particular loan opportunity from the different loan opportunities;

in response to the selections of the first particular loan opportunity from the plurality of different loan opportunities by the first investor system, receiving details of the first particular loan opportunity including at least some of the first property information identifying the first property to the first investor system and receiving an indication of a second commitment to invest by a second investor in the first particular loan opportunity, the first investor system and a second investor system being remote from each other and operated by a first investment entity and the second investor, respectively;

providing, in real-time, a first commitment from the first investor system to partially fund a first partial funding of a loan amount associated with the first particular loan opportunity, a second commitment from the second investor system being already provided to the investment system to partially fund a second partial funding of the loan amount associated with the first particular loan opportunity;

receiving, in real-time, an indication that a first loan is to be provided to the first property owner when the loan amount associated with the first particular loan opportunity is completely funded;

receiving distributions, every day, of daily returns, a first amount of the daily returns of a first investor being based on an amount of the first partial funding of the loan amount of the first loan, thereby providing a centralized architecture to publish and arrange investments from different investors for the plurality of different loan opportunities;

authenticating a first encryption key of the first property owner of a first property owner system, a second encryption key of the first investor of the first investor system, and a third encryption key of the second investor of the second investor system;

providing, in response to authenticating the first encryption key and the second encryption key and the third encryption key, a communication channel among the first property owner system, the first investor system, and the second investor system for communication over the network;

creating a secure record of communication in the communication channel among the first property owner system, the first investor system, and the second investor system, the creating the secure record including encrypting the communication in the communication channel among the first property owner system, the first investor system, and the second investor system;

providing a second query for the secure record from the first investor system; and receiving the secure record upon authentication of the second query.

2. The non-transitory computer readable medium of claim 1, the method further comprising receiving distributions of daily returns of the first investor on the first day that a loan associated with the first particular loan opportunity is provided.

3. The non-transitory computer readable medium of claim 1, the method further comprising:

receiving an agreement to be signed by the first investor, second investor, and entity operating the investment system to agree to fund the loan and receive distributions, the agreement being populated based on an identity of the first property owner, an identity of the first investment entity, an identity of an second investment entity, the loan amount, the first loan terms, and the first property information to create a first agreement; and providing a signed copy of the agreement to the investment system.

4. The non-transitory computer readable medium of claim 1, the method further comprising:

navigating, by the first investor system, to the first investment interface on the network provided by the investment system, the investment system publishing a second particular loan opportunity of the plurality of loan opportunities, the second particular loan opportunity being for a second loan secured by second property owned by a second property owner of a second property owner system, second property information identifying the second property, the second property owner system being remote from the investment system and the first property owner system, the first property owner being different than the second property owner, the second particular loan opportunity being an opportunity to invest in the second loan and no other loans, second terms being agreed upon by a second property owner seeking the second loan, the investment system having assessed a second value of the second property based, at least in part, on the second property information of the second property;

providing, from the first investor system, a second query to seek loan opportunities;

receiving different loan opportunities of the plurality of different loan opportunities based on the second query;

providing a selection of the second particular loan opportunity from the different loan opportunities;

in response to the selections of the second particular loan opportunity from the plurality of different loan opportunities by the first investor system, receiving details of the second particular loan opportunity including at least some of the second property information identifying the second property to the first investor system;

providing, in real time, a second commitment from the first investor system to partially fund a first partial funding of a loan amount associated with the second particular loan opportunity;

receiving, in real time, an indication that a second loan is to be provided to the second property owner when the loan amount associated with the second particular loan opportunity is completely funded; and receiving distributions, every day, of daily returns of the first investor, a second amount of the daily returns of the first investor being based on an amount of the first partial funding of the loan amount of the second loan.

5. The non-transitory computer readable medium of claim 1, wherein the investment system provides instructions over the network to a financial institution to distribute the daily returns.

6. The non-transitory computer readable medium of claim 5, wherein receiving distributions, every day, of daily returns, comprises receiving distributions, every day, of daily returns from a financial institution that received instructions from the investment system to provide the daily returns.

7. The non-transitory computer readable medium of claim 1, wherein a facilitating entity that operates the investment system registers the first loan as a sole debtor.

8. The non-transitory computer readable medium of claim 1, the method further comprising providing an encryption key to determine if the first investor is authorized to receive the secure record.

9. The non-transitory computer readable medium of claim 1, the method further comprising navigating to a dashboard viewable by the first investor system over the network, the dashboard indicating, in real time, daily payments made and future daily payments for any number of loans funded by the first investment entity using the investment system.

10. An investment system comprising:
at least one processor;
a network interface to communicate over a network; and
memory, the memory including instructions to control the at least one processor to:
navigate to a first investment interface on a network provided by an investment system, the first investment interface being provided to an investor's digital device, the investment system publishing on the first investment interface a first particular loan opportunity among a plurality of different loan opportunities, the first particular loan opportunity being based on first loan terms and first property information, the plurality of different loan opportunities being searchable through an interface provided by the investment system, the first property information identifying a first property to secure a first loan of the first particular loan opportunity, the first particular loan opportunity being an opportunity to invest in the first loan and no other loans, the first loan terms being agreed upon by a first property owner seeking the first loan, the investment system having assessed a first value of the first property based, at least in part, on the first property information of the first property;
provide a first query to seek loan opportunities;
receive different loan opportunities of the plurality of different loan opportunities based on the first query;
provide a selection of the first particular loan opportunity from the different loan opportunities;
in response to the selections of the first particular loan opportunity from the plurality of different loan opportunities, receive details of the first particular loan opportunity including at least some of the first property information identifying the first property and receiving an indication of a second commitment to invest by a second investor of a second investor system in the first particular loan opportunity, a first investor system and the second investor system being remote from each other and operated by a first investment entity and a second investment entity, respectively;
provide, in real-time, a first commitment from the first investor system to partially fund a first partial funding of a loan amount associated with the first particular loan opportunity, a second commitment from the second investor system being already provided to the investment system to partially fund a second partial funding of the loan amount associated with the first particular loan opportunity;
receive, in real-time, an indication that a first loan is to be provided to the first property owner when the loan amount associated with the first particular loan opportunity is completely funded;
receive distributions, every day, of daily returns, a first amount of the daily returns of a first investor being based on an amount of the first partial funding of the loan amount of the first loan, thereby providing a centralized architecture to publish and arrange investments for the plurality of loan opportunities;
authenticate a first encryption key of the first property owner of a first property owner system, a second encryption key of the first investor of the first investor system, and a third encryption key of the second investor of the second investor system;
provide, in response to authenticating the first encryption key and the second encryption key and the third encryption key, a communication channel among the first property owner system, the first investor system, and the second investor system for communication over the network;
create a secure record of communication in the communication channel among the first property owner system, the first investor system, and the second investor system, the creating the secure record including encrypting the communication in the communication channel among the first property owner system, the first investor system, and the second investor system;
provide a second query for the secure record from the first investor system; and
receive the secure record upon authentication of the second query.

11. The investment system of claim 10, the memory including instructions to control the at least one processor to further receive distributions of daily returns by the first investor on the first day that a loan associated with the first particular loan opportunity is provided.

12. The investment system of claim 10, the memory including instructions to control the at least one processor to further:
receive an agreement to be signed by the first investor, second investor, and entity operating the investment system to agree to fund the loan and receive distributions, the agreement being populated based on an identity of the first property owner, an identity of the first investment entity, an identity of an second investment entity, the loan amount, the first loan terms, and the first property information to create a first agreement; and
provide a signed copy of the agreement to the investment system.

13. The investment system of claim 10, the memory including instructions to control the at least one processor to further:

navigate to the first investment interface on the network provided by the investment system, the investment system publishing a second particular loan opportunity of the plurality of loan opportunities, the second particular loan opportunity being for a second loan secured by second property owned by a second property owner of a second property owner system, second property information identifying the second property, the second property owner system being remote from the investment system and the first property owner system, the first property owner being different than the second property owner, the second particular loan opportunity being an opportunity to invest in the second loan and no other loans, second terms being agreed upon by a second property owner seeking the second loan, the investment system having assessed a second value of the second property based, at least in part, on the second property information of the second property;

provide, from the first investor system, a second query to seek loan opportunities;

receiving different loan opportunities of the plurality of different loan opportunities based on the second query;

provide a selection of the second particular loan opportunity from the different loan opportunities;

in response to the selections of the second particular loan opportunity from the plurality of different loan opportunities by the first investor system, receive details of the second particular loan opportunity including at least some of the second property information identifying the second property to the first investor system;

provide, in real time, a second commitment from the first investor system to partially fund a first partial funding of a loan amount associated with the second particular loan opportunity;

receive, in real time, an indication that a second loan is to be provided to the second property owner when the loan amount associated with the second particular loan opportunity is completely funded; and receive distributions, every day, of daily returns, a second amount of the daily returns of the first investor being based on an amount of the first partial funding of the loan amount of the second loan.

14. The investment system of claim 10, wherein the investment system provides instructions over the network to a financial institution to distribute the daily returns.

15. The investment system of claim 14, wherein receiving, every day, daily returns comprises the investment system providing instructions over the network to the financial institution to provide the daily returns to the first investor.

16. The system of claim 10, wherein a facilitating entity that operates the investment system registers the first loan as a sole debtor.

17. The investment system of claim 10, wherein authenticating the second query comprises providing an encryption key to determine if the first investor is authorized to receive the secure record.

18. The investment system of claim 10, the memory including instructions to control the at least one processor to further navigate to a dashboard viewable by the first investor system over the network, the dashboard indicating, in real time, daily payments made and future daily payments for any number of loans funded by the first investor using the investment system.

19. A method comprising:

navigating, using a first investor system, to a first investment interface on a network provided by an investment system, the first investment interface being provided to an investor's digital device, the investment system publishing on the first investment interface a first particular loan opportunity among a plurality of different loan opportunities, the first particular loan opportunity being based on first loan terms and first property information, the plurality of different loan opportunities being searchable through an interface provided by the investment system, the first property information identifying a first property to secure a first loan of the first particular loan opportunity, the first particular loan opportunity being an opportunity to invest in the first loan and no other loans, the first loan terms being agreed upon by a first property owner seeking the first loan, the investment system having assessed a first value of the first property based, at least in part, on the first property information of the first property;

providing, from the first investor system, a first query to seek loan opportunities;

receiving different loan opportunities of the plurality of different loan opportunities based on the first query;

providing a selection of the first particular loan opportunity from the different loan opportunities;

in response to the selections of the first particular loan opportunity from the plurality of different loan opportunities by the first investor system, receiving details of the first particular loan opportunity including at least some of the first property information identifying the first property to the first investor system and receiving an indication of a second commitment to invest by a second investor in the first particular loan opportunity, the first investor system and a second investor system being remote from each other and operated by a first investment entity and the second investor, respectively;

providing, in real-time, a first commitment from the first investor system to partially fund a first partial funding of a loan amount associated with the first particular loan opportunity, a second commitment from the second investor system being already provided to the investment system to partially fund a second partial funding of the loan amount associated with the first particular loan opportunity;

receiving, in real-time, an indication that a first loan is to be provided to the first property owner when the loan amount associated with the first particular loan opportunity is completely funded;

receiving distributions, every day, of daily returns, a first amount of the daily returns of a first investor being based on an amount of the first partial funding of the loan amount of the first loan, thereby providing a centralized architecture to publish and arrange investments from different investors for the plurality of different loan opportunities;

authenticating a first encryption key of the first property owner of a first property owner system, a second encryption key of the first investor of the first investor system, and a third encryption key of the second investor of the second investor system;

providing, in response to authenticating the first encryption key and the second encryption key and the third encryption key, a communication channel among the first property owner system, the first investor system, and the second investor system for communication over the network;

creating a secure record of communication in the communication channel among the first property owner system, the first investor system, and the second investor system, the creating the secure record including encrypting the communication in the communication channel among the first property owner system, the first investor system, and the second investor system;

providing a second query for the secure record from the first investor system; and receiving the secure record upon authentication of the second query.

\* \* \* \* \*